(12) United States Patent
Kuramoto et al.

(10) Patent No.: US 7,860,535 B2
(45) Date of Patent: Dec. 28, 2010

(54) RADIO-FREQUENCY RECEIVER DEVICE

(75) Inventors: Katsuyuki Kuramoto, Nagoya (JP);
Tomoyasu Fukui, Inuyama (JP)

(73) Assignee: Brother Kogyo Kabushiki Kaisha,
Nagoya-shi, Aichi-ken (JP)

( * ) Notice: Subject to any disclaimer, the term of this patent is extended or adjusted under 35 U.S.C. 154(b) by 823 days.

(21) Appl. No.: 11/671,949

(22) Filed: Feb. 6, 2007

(65) Prior Publication Data
US 2007/0224942 A1 Sep. 27, 2007

Related U.S. Application Data

(63) Continuation-in-part of application No. PCT/JP2005/010381, filed on Jun. 6, 2005.

(30) Foreign Application Priority Data

Aug. 6, 2004 (JP) ............................. 2004-230236
Sep. 15, 2004 (JP) ............................. 2004-267787

(51) Int. Cl.
*H04M 1/00* (2006.01)
(52) U.S. Cl. .................................. 455/562.1; 455/63.4
(58) Field of Classification Search ................ 455/90.1, 455/90.2, 193.1, 214, 226.1, 226.2, 562.1, 455/63.2, 63.4, 114.2, 456.1–457, 269, 272–294
See application file for complete search history.

(56) References Cited

U.S. PATENT DOCUMENTS 6,009,124 A * 12/1999 Smith et al. ................. 375/267
6,229,486 B1 * 5/2001 Krile ................... 343/700 MS
6,944,437 B2 * 9/2005 Yang et al. ................... 455/323
2002/0128052 A1 * 9/2002 Neagley et al. ............. 455/575
2003/0157897 A1 8/2003 Maeda et al.

(Continued)

FOREIGN PATENT DOCUMENTS

JP H08-019035 A 1/1996

(Continued)

OTHER PUBLICATIONS

Internation Bureau; International Preliminary Report on Patentability for Related International Patent Application No. PCT/JP2005/010381, dated Feb. 6, 2007.

(Continued)

*Primary Examiner*—Blane J Jackson
(74) *Attorney, Agent, or Firm*—Baker Botts L.L.P.

(57) ABSTRACT

A radio-frequency receiver device including receiver antenna elements each arranged to receive a signal from a desired communication object, a phased-array control portion to perform a phased array antenna control for controlling the directivity of reception of the signals by the receiver antenna elements, an adaptive-array control portion to perform an adaptive array antenna control for controlling the directivity of reception of the signals by the receiver antenna elements, a received-signal-quality determining portion to determine whether the signals received by the receiver antenna elements has a quality higher than a predetermined threshold, and a directivity control switching portion configured to enable the phased-array control portion to perform the phased array antenna controls, and to enable the adaptive-array control portion to perform the adaptive array antenna control only if a negative determination is obtained by the received-signal-quality determining portion after the phased array antenna control.

15 Claims, 24 Drawing Sheets

U.S. PATENT DOCUMENTS

| | | | |
|---|---|---|---|
| 2005/0101353 A1* | 5/2005 | Zeira et al. | 455/562.1 |
| 2005/0113138 A1* | 5/2005 | Mendolia et al. | 455/558 |
| 2006/0014497 A1 | 1/2006 | Doi et al. | |
| 2007/0037529 A1* | 2/2007 | Nagai et al. | 455/101 |

FOREIGN PATENT DOCUMENTS

| | | |
|---|---|---|
| JP | 2000-357911 A | 12/2000 |
| JP | 2002-280945 A | 9/2002 |
| JP | 2003-243921 A | 8/2003 |
| JP | 2003-283411 A | 10/2003 |

OTHER PUBLICATIONS

International Search Report for Int'l Patent Appl'n No. PCT/JP2005/010381, mailed Sep. 6, 2005.

Japan Patent Office; Office Action in Patent Application No. JP 2004-267787 (counterpart to the above-captioned U.S. patent application) mailed Mar. 3, 2010.

* cited by examiner

RADIO-FREQUENCY RECEIVER DEVICE

The present application is a Continuation-in-Part of International Application No. PCT/JP2005/010381 filed Jun. 6, 2005, which claims the benefits of Japanese Patent Application Nos. 2004-230236 and 2004-267787 which were respectively filed on Aug. 6 and Sep. 15, 2004, each of which is incorporated herein by reference.

BACKGROUND OF THE INVENTION

1. Field of the Invention

The present invention relates to improvements of a radio-frequency receiver device provided with a plurality of receiver antenna elements arranged to receive a signal transmitted from a desired communication object.

2. Description of the Related Art

There is known a radio-frequency identification system (an RFID system) including small-sized radio-frequency tags (transponders) storing predetermined information, and a radio-frequency tag communication device (interrogator) arranged to read desired information from the radio-frequency tags in a non-contact fashion. The radio-frequency communication device of this RFID system is capable of reading out the information from the radio-frequency tags, by radio communication with the radio-frequency tags, even where the radio-frequency tags are soiled or located at invisible places. For this reason, the RFID system is expected to be used in various fields such as management and inspection of commodities.

Such a radio-frequency tag communication device includes a radio-frequency receiver device which is provided with a plurality of receiver antenna elements to receive signals transmitted from communication objects in the form of radio-frequency tags and which is arranged to control the directivity of the receiver antenna elements for communication with the desired radio-frequency tag. JP-2003-283411A discloses an example of such a radio-frequency receiver device, and JP-2002-280945A discloses an example of control of the directivity of the receiver antenna elements. See paragraphs [0002]-[0035] and FIG. 3 of JP-2002-280945A. According to the techniques disclosed in these publications, the radio-frequency receiver device is provided with a receiver antenna device in the form of an array antenna device having a plurality of receiver antenna elements, and the received signals received by these receiver antenna elements are subjected to an adaptive array antenna control according to controlled weights given to the respective received signals. The received signals multiplied by the weights are combined together into a composite signal, which is demodulated for reading the information transmitted from the desired radio-frequency tag. The weights are updated so as to minimize an error between the modulated signal and a reference signal, for thereby maximize the sensitivity of reception of the received signals by the receiver antenna elements from the desired communication object, whereby the directivity of the array antenna device is suitably controlled for adequate radio communication between the radio-frequency communication device and the desired radio-frequency tag.

There is also known a phased array antenna control as another type of directivity control of the plurality of receiver antenna elements of the radio-frequency receiver device. According to the phased array antenna control, the directivity of reception of the receiver antenna elements is maximized in a selected one direction, which is changed from time to time to accurately detect the position or direction of the desired communication object or radio-frequency tag.

However, the conventional adaptive array antenna (AAA) processing requires a large volume of calculation of the weights to be given to the received signals received by the respective receiver antenna elements, according to a suitable adaptive processing algorithm, and therefore undesirably takes a considerable time for the large volume of calculation of the weights.

The radio-frequency communication system generally has an operating environment in which there are various electric wave hindrance or interference objects between the radio-frequency transmitter and receiver devices, so that the receiver antenna device of the radio-frequency receiver device provided to receive a desired reply wave directly from the radio-frequency transmitter device may also receive reflected waves which are components of the reply wave that are reflected by the electric wave hindrance or interference objects. The conventional adaptive array antenna control has a risk of controlling the directivity of reception of the array antenna device with respect to the reflected waves as well as the desired reply wave, so that the sensitivity of reception of the desired reply wave from the radio-frequency transmitter device may be deteriorated. On the other hand, the conventional phased array antenna control has a risk of erroneous determination or recognition that the direction in which the reflected waves are received is the direction in which the radio-frequency transmitter device is located. This risk of erroneous determination is high where a difference between the amplitudes of the desired replay wave and the reflected waves that have been received by the receiver antenna device is not so large. Accordingly, the conventional phased array antenna control does not assure efficient or rapid determination of the direction in which the radio-frequency transmitter device is located. Thus, there has been a need of developing a radio-frequency receiver device capable of efficient control of the directivity of the receiver antenna elements.

SUMMARY OF THE INVENTION

The present invention was made in view of the background art described above. Accordingly, it is an object of the present invention to provide a radio-frequency receiver device capable of efficiently controlling the directivity of reception of the receiver antenna elements.

The object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only.

(1) A radio-frequency receiver device including a plurality of receiver antenna elements each arranged to receive a signal transmitted from a desired communication object, the radio-frequency receiver device comprising: a phased-array control portion configured to perform a phased array antenna control for controlling a directivity of reception of the signals by the plurality of receiver antenna elements; an adaptive-array control portion configured to perform an adaptive array antenna control for controlling the directivity of reception of the signals by the plurality of receiver antenna elements; a received-signal-quality determining portion configured to determine whether the signals received by the plurality of receiver antenna elements has a quality higher than a predetermined threshold; and a directivity control switching portion configured to enable the phased-array control portion to perform the phased array antenna control for controlling the directivity of reception of the signals, and to enable the adaptive-array control portion to perform the adaptive array antenna control for controlling the directivity of reception of the signals only if a negative determination is obtained by the received-signal-quality determining portion after the phased array antenna control.

In the radio-frequency receiver device constructed according to the above-described mode (1), the directivity control switching portion first enables the phased-array control portion to perform the phased array antenna control for controlling the directivity of reception of the signals by the plurality of receiver antenna elements, and enables the adaptive-array control portion to perform the adaptive array antenna control for controlling the directivity of reception, only if the negative determination is obtained by the received-signal-quality determining portion arranged to determine whether the signals received by the receiver antenna elements has a quality higher than the predetermined threshold. Thus, the adaptive array antenna control is performed only when this control is necessary, so that the time required for processing the received signals can be shortened, without unnecessary calculation for the adaptive array antenna control. Accordingly, the present receiver antenna device is capable of efficiently controlling the directivity of reception of the receiver antenna elements.

(2) The radio-frequency receiver device according to the above-described mode (1), wherein the adaptive-array control portion determines initial values of weights to be respectively given to the signals received by the plurality of receiver antenna elements, on the basis of a result of the phased array antenna control by the phased-array control portion. In this mode (2), the time required for the adaptive array antenna control can be shortened.

(3) The radio-frequency receiver device according to the above-described mode (1) or (2), wherein the directivity control switching portion enables the phased-array control portion to perform the phased array antenna control if the negative determination is obtained by the received-signal-quality determining portion while the directivity of reception of the signals received by the plurality of receiver antenna elements is set at an initial value. In this mode (3), the time required for processing the receiving signals can be shortened.

(4) The radio-frequency receiver device according to any one of the above-described modes (1)-(3), wherein the received-signal-quality determining portion comprises a received-signal-strength determining portion configured to determine whether the signals received by the plurality of receiver antenna elements have a strength higher than a predetermined threshold, the negative determination being obtained by the received-signal-quality determining portion when a negative determination is obtained by the received-signal-strength determining portion. In this mode (4), the quality of the received signals can be accurately evaluated on the basis of the strength of the received signals.

(5) The radio-frequency receiver device according to any one of the above-described modes (1)-(3), wherein the received-signal-quality determining portion comprises an interfering-wave determining portion configured to determine whether the signals received by the plurality of receiver antenna elements include an interfering wave, and the negative determination is obtained by the received-signal-quality determining portion when an affirmative determination is obtained by the interfering-wave determining portion. In this mode (5), the quality of the signals received by the receiver antenna elements can be adequately evaluated depending upon whether the interfering wave is included in the received signals or not.

(6) The radio-frequency receiver device according to any one of the above-described modes (1)-(3), further comprising a decoding portion configured to decode the signals received by the plurality of receiver antenna elements, into a decoded signal, and wherein the received-signal-quality determining portion comprises an error determining portion configured to determine whether a quality of the decoded signal generated by the decoding portion is higher than a predetermined threshold, the negative determination being obtained by the received-signal-quality determining portion when a negative determination is obtained by the error determining portion. In this mode (6), the quality of the received signals can be adequately evaluated on the basis of the quality of the decoded signal generated by the decoding portion.

(7) The radio-frequency receiver device according to any one of the above-described modes (1)-(6), wherein the communication object is a radio-frequency tag configured to transmit the signal in response to a transmitted signal received from a radio-frequency communication device which is provided with the radio-frequency receiver device. In this mode (7), the radio-frequency receiver device included in the radio-frequency communication device is capable of efficient control of the directivity of reception of the received signals by the receiver antenna elements.

(8) A radio-frequency receiver device comprising: a plurality of antenna elements each arranged to receive, by radio communication, a signal transmitted from a communication object; a first control portion configured to perform a first control of gradually changing a directivity of reception of the plurality of antenna elements; a second control portion configured to perform a second control of changing the directivity of reception of the plurality of antenna elements, for maximizing a sensitivity of reception of the signals from the communication objects; and a directivity control portion configured to control the directivity of reception of the plurality of antenna elements, by operating the first and second control portions.

In the radio-frequency receiver device constructed according to the above-described mode (8) of this invention, the directivity control portion controls the directivity of reception of the plurality of antenna elements, by selectively operating the first control portion (phased-array control portion) configured to gradually change the directivity of reception of the antenna elements, and the second control portion (adaptive-array control portion) configured to change the directivity of reception so that the signals received by the antenna elements approach a reference signal, whereby the sensitivity of reception of the signals from the communication object is maximized. Thus, the present radio-frequency receiver device is capable of not only determining the direction of reception of the received signals by the phased array antenna control, but also improving the sensitivity of reception of the signals by the adaptive array antenna control, in a comparatively short time.

(9) The radio-frequency receiver device according to the above-descried mode (8), wherein the directivity control portion controls the directivity of reception of the plurality of antenna elements, by selectively enabling the first and second control portions to operate. In this mode (9), the phased array antenna control by the first control portion to determine the direction of reception of the signals from the communication object, and the adaptive array antenna control by the second control portion to improve the sensitivity of reception of the signals can be performed in a cooperative relation with each other.

(10) The radio-frequency receiver device according to the above-described mode (8) or (9), wherein the directivity control portion operates the second control portion to maximize the sensitivity of reception of the signals from the communication objects, on the basis of a result of the first control by the first control portion. In this mode (10), the sensitivity of reception in the direction of the communication object determined by the first control (phased array antenna control) is maximized by the second control (adaptive array antenna control). Accordingly, the combination of the phased array antenna control and the adaptive array antenna control in this mode (10) permits a high degree of sensitivity of reception of the signals to be established in a shorter time, than the adaptive array control only.

(11) The radio-frequency receiver device according to the above-described mode (10), wherein the directivity control portion includes: a weight determining portion configured to determine weights to be given to the signals received by the plurality of antenna elements, on the basis of the result of the first control by the first control portion, such that a composite signal obtained by combining together the signals multiplied by the determined weights approaches a reference signal; and a composite-signal generating portion configured to generate the composite signal by combining together the signals multiplied by the weights determined by the weight determining portion. In this mode (12), the weights are determined on the basis of the result of the first control (phased array antenna control) by the first control portion (on the basis of the detected direction of the communication object), and the composite signal is generated by combining together the signals multiplied by the determined objects. Accordingly, the phased array antenna control is utilized for the adaptive array antenna control, so that the high degree of sensitivity of the signals can be established in a comparatively short time.

(12) The radio-frequency receiver device according to the above-described mode (11), further comprising a demodulating portion configured to demodulate the composite signal generated by the composite-signal generating portion, or a signal based on the composite signal. In this mode (12), the composite signal which reflects the adaptive array antenna control or a signal based on this composite signal is demodulated into a demodulated signal which has a relatively high strength, so that the desired information included in the signal transmitted from the communication object can be accurately obtained by the radio-frequency receiver device.

(13) The radio-frequency receiver device according to the above-described mode (12), wherein the directivity control portion includes a judging portion configured to determine whether the signals received by the plurality of antenna elements are signals received from the communication object, depending upon a result of a demodulating operation of the demodulating portion, and the weight determining portion determines the weights on the basis of a result of a judgment by the judging portion. In this mode (13), the weights to be given to the signals received by the antenna elements can be determined so as to increase the sensitivity of reception of the received signals in the direction in which the communication object is located, and to reduce the sensitivity of reception in the direction in which the communication object is not located. Accordingly, the strength of the signals received by the antenna elements can be efficiently and effectively improved.

(14) The radio-frequency receiver device according to the above-described mode (13), wherein the weight determining portion determines said weight, such that the sensitivity of reception of the signals by the plurality of antenna elements is made higher in the direction in which an affirmative determination is obtained by the judging portion, than in the direction in which a negative determination is obtained by the judging portion. In this mode (14), the weights are determined so as to increase the sensitivity of reception of the received signals or the directivity of reception of the antenna elements, in the direction which the communication object is located, and to reduce the sensitivity or reception of the received signals or the directivity of reception of the antenna elements, in the direction in which the communication object is not located. Accordingly, the strength of the signals received from the communication object can be increased in a comparatively short time.

(15) The radio-frequency receiver device according to any one of the above-described modes (8)-(10), wherein the directivity control portion includes: an arithmetic portion; a first weight determining portion configured to determine first weights for the first control, on the basis of a phase control signal received from the arithmetic portion; a first composite-signal generating portion configured to generate a first composite signal for the first control, on the basis of the first weights determined by the first weight determining portion; a second weight determining portion configured to determine second weights for the second control, on the basis of a phase/amplitude control signal received from the arithmetic portion; and a second composite-signal generating portion configured to generate a second composite signal for the second control, on the basis of the second weights determined by the second weight determining portion. In this mode (15), the first weights are determined by the first weight determining portion on the basis of the phase control signal generated by the arithmetic portion, and the first composite signal is generated by the first composite-signal generating portion on the basis of the first weights, whereby the phased array antenna control is implemented. Similarly, the second weights are determined by the second weight determining portion on the basis of the phase/amplitude control signal generated by the arithmetic portion, and the second composite signal is generated by the second composite-signal generating portion on the basis of the second weights, whereby the adaptive array antenna control is implemented.

(16) The radio-frequency receiver device according to the above-described mode (15), wherein the first composite-signal generating portion and the second composite-signal generating portion are constituted by a common composite-signal generating portion which is configured to selectively generate the first composite signal for the first control on the basis of the first weights, or the second composite signal for the second control on the basis of the second weights. In this mode (16), the common composite-signal generating portion is used for both the signals subjected to the phased array antenna control and the signals subjected to the adaptive array antenna control, whereby the overall construction of the radio-frequency receiver device is simplified, and the cost of manufacture of the radio-frequency receiver device is reduced.

(17) The radio-frequency receiver device according to the above-described mode (16), wherein the directivity control portion includes a switching portion configured to selectively apply the first weights or the second weights to the common composite-signal generating portion. In this mode (17), the first weights determined by the first weight determining portion, or the second weights determined by the second weight determining portion are selectively applied by the switching portion to the common composite-signal generating portion, so that the common composite-signal generating portion functions selectively as the first composite-signal generating portion for the phased array antenna control when the common composite-signal generating portion receives the first weights (phase control signals) from the first weight determining portion, or as the second composite-signal generating portion for the adaptive array antenna control when the common composite-signal generating portion receives the second weights (phase/amplitude control signals) from the second weight determining portion.

(18) The radio-frequency receiver device according to the above-described mode (17), wherein the directivity control portion includes a switching control portion configured to control the switching portion such that the first weights determined by the first weight determining portion are applied to the common composite-signal generating portion, during a first time division, while the second weights determined by the second weight determining portion are applied to the common composite-signal generating portion, during a second time division. In this mode (18), the switching portion is controlled by the switching control portion, to perform the phased array antenna control during the first time division in which the first composite signal for the first control is generated by the common composite-signal generating portion on the basis of the first weights determined by the first weight determining portion, and to perform the adaptive array antenna control during the second time division in which the second composite signal for the second control is generated by the common composite-signal generating portion on the basis of the second weights determined by the second weight determining portion.

(19) The radio-frequency receiver device according to the above-described mode (18), wherein the switching control portion controls the switching portion such that a ratio of the first and second time division is variable. In this mode (19) wherein the ratio of the first and second time divisions is variable, the time proportion of the phased array antenna control and the adaptive array antenna control can be varied as desired.

BRIEF DESCRIPTION OF THE DRAWING

The above and other objects, features and industrial significance of this invention will be better understood by reading the following detailed description of preferred embodiments of the invention, when considered in connection with the accompanying drawings in which.

DETAILED DESCRIPTION OF THE PREFERRED EMBODIMENTS

The preferred embodiments of this invention will be described in detail by reference to the accompanying drawings.

Embodiment 1

Figure 1:
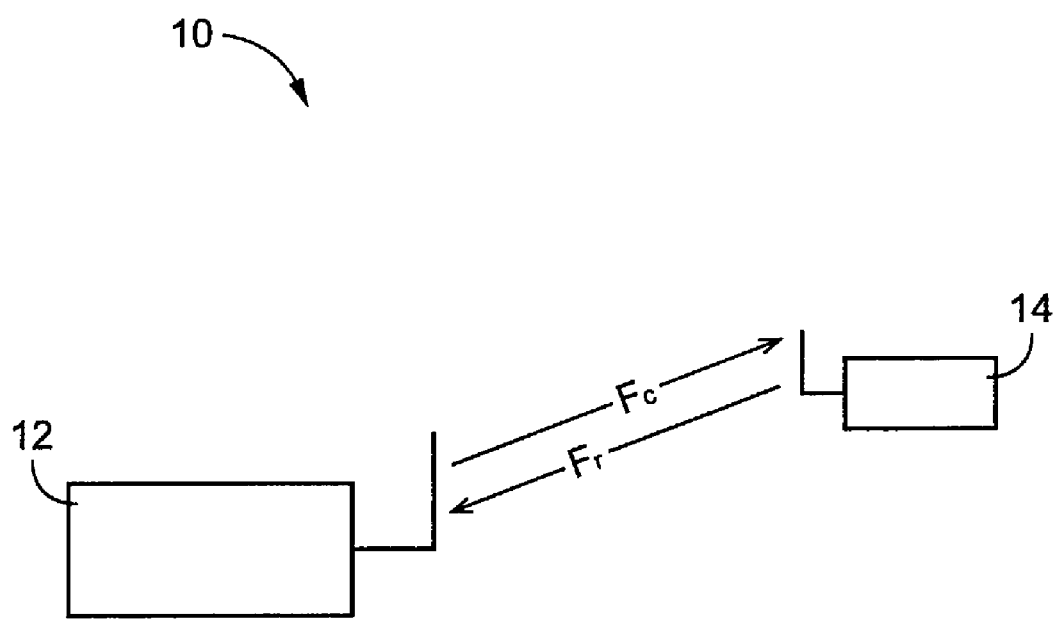
FIG. 1 is a view showing a communication system including a radio-tag communication device provided with a radio-frequency receiver device constructed according to a first embodiment of the present invention.

Referring to FIG. 1, there is shown an arrangement of a communication system 10 including a radio-frequency receiver device constructed according to a first embodiment of this invention. This communication system 10 is a so-called RFID (radio-frequency identification) system which consists of a radio-frequency tag communication device 12 incorporating the above-indicated radio-frequency receiver device 62 (shown in FIG. 2), and at least one communication object each in the form of a radio-frequency tag 14 (only one tag 14 shown in FIG. 1). The radio-frequency tag communication device 12 functions as an interrogator of the RFID system 10, while each radio-frequency tag 14 functions as a transponder of the RFID system 10. Described in detail, the radio-frequency tag communication device 12 is arranged to transmit an interrogating wave Fc (transmitted signal) toward the radio-frequency tag 14, and the radio-frequency tag 14 which has received the interrogating wave Fc modulates the received interrogating wave Fc according to a desired information signal (data), and transmits the modulated wave as a reply wave Fr (reply signal) toward the radio-frequency tag communication device 12. Thus, radio communication is effected between the radio-frequency tag communication device 12 and the radio-frequency tag 14.

Figure 2:
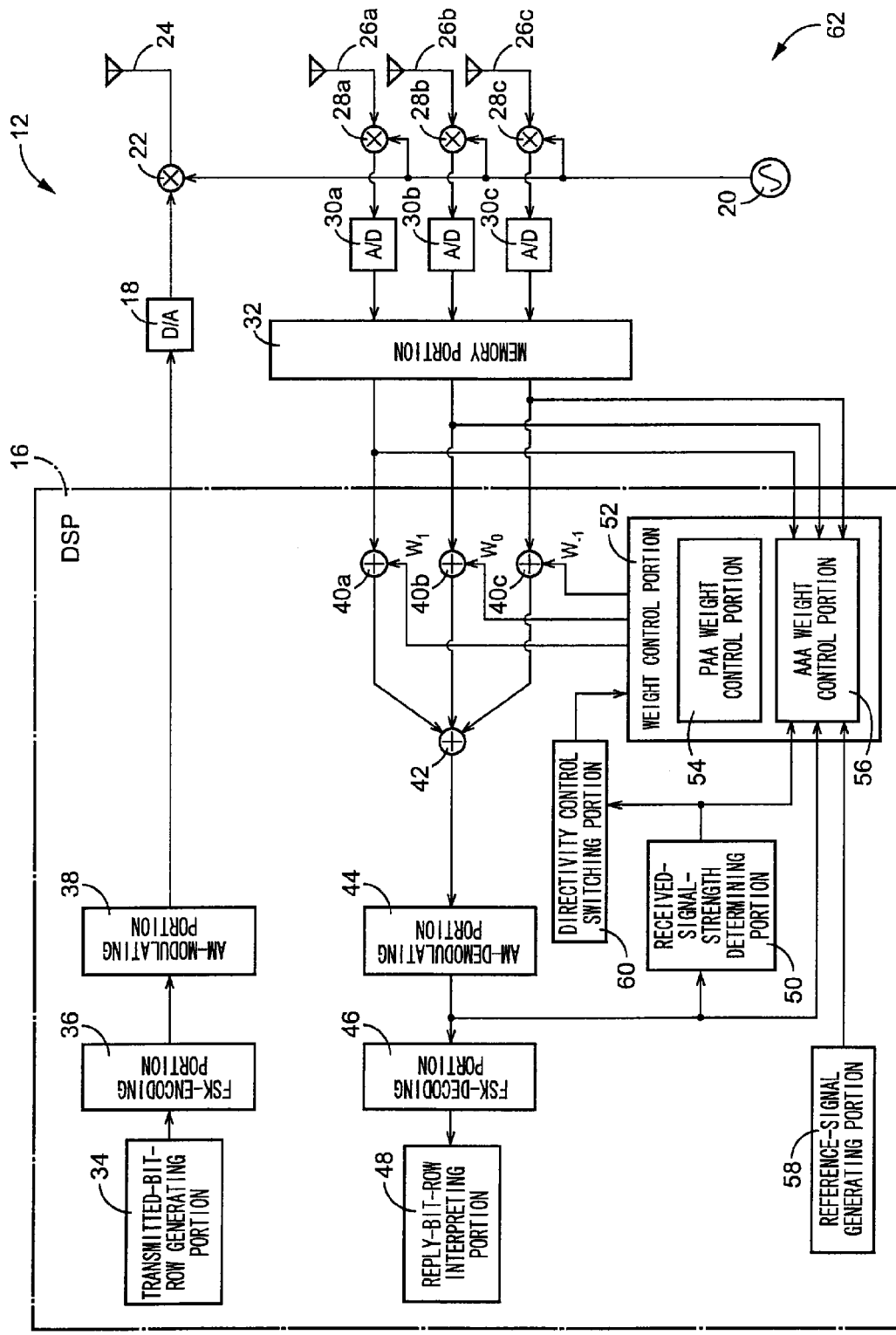
FIG. 2 is a block diagram showing an arrangement of the radio-frequency tag communication device of the communication system of FIG. 1.

Referring next to the block diagram of FIG. 2, there is shown an arrangement of the radio-frequency tag communication device 12. As shown in FIG. 2, the radio-frequency tag communication device 12 is arranged to effect radio communication with the radio-frequency tag 14, for writing information on the radio-frequency tag 14, or for detecting the direction in which the radio-frequency tag 14 is located. The radio-frequency tag communication device 12 includes: a DSP (digital signal processor) 16 configured to generate the digital transmitted signal, and to perform digital signal processing operations such as an operation to demodulate the reply signal received from the radio-frequency tag 14; a transmitted-signal D/A converting portion 18 configured to convert the digital transmitted signal generated by the DSP 16, into an analog signal; a frequency-converting-signal generating portion 18 configured to generate a predetermined frequency converting signal; an up converter 22 configured to increase the frequency of the analog signal received from the transmitted-signal D/A converting portion 18, by an amount equal to the frequency of the frequency converting signal received from the frequency-converting-signal generating portion 20; a transmitter antenna device in the form of a transmitter antenna element 24 arranged to transmit the analog signal received from the up converter 22, as the interrogating wave Fc, toward the radio-frequency tag 14; a receiver antenna device in the form of a plurality of receiver antenna elements (three receiver antenna elements 26a, 26b, 26c in the example of FIG. 2, which are hereinafter collectively referred to as "receiver antenna elements 26", unless otherwise specified) arranged to receive the reply wave Fr transmitted from the radio-frequency tag 14 in response to the interrogating wave Fc; a plurality of down converters (three down converters 28a, 28b, 28c in the example of FIG. 2, which are hereinafter collectively referred to as "down converters 28", unless otherwise specified) configured to reduce the frequencies of the received signals received by the receiver antenna elements 26, by the amount equal to the frequency of the frequency converting signal received from the frequency-converting-signal generating portion 20; a plurality of received-signal A/D converting portions (three converting portions 30a, 30b, 30c in the example of FIG. 2, which are hereinafter collectively referred to as "received-signal A/D converting portions 30", unless otherwise specified) configured to convert the received signals received from the down converters 28, into digital signals; and a memory device in the form of a memory portion 32 configured to store the digital received signals received from the received-signal A/D converting portions 30, and to supply the stored digital received signals to the DSP 16 according to a command received from the DSP 16.

The DSP 16 is a so-called microcomputer system which incorporates a CPU, a ROM and a RAM and which operates to perform digital signal processing operations according to a control program stored in the ROM, while utilizing a temporary data storage function of the RAM. The DSP 16 has functional portions including a transmitted-bit-row generating portion 34 configured to generate a row of command bits for the transmitted signal to be transmitted to the radio-frequency tag 14; an FSK-encoding portion 36 configured to encode the digital signal received from the transmitted-bit-row generating portion 34, according to an FSK-encoding method; an AM-modulating portion 38 configured to modulate the encoded signal received from the FSK-encoding portion 36, according to an AM (amplitude modulation) method; a plurality of weight multiplying portions (three weight multiplying portions 40a, 40b, 40c in the example of FIG. 2, which are hereinafter collectively referred to as "weight multiplying portions 40", unless otherwise specified) configured to multiply the received signals (received by the respective receiver antenna elements 26 and read out from the memory portion 32) by respective PAA weights or AAA weights calculated by a weight control portion 52 (which will be described); a received-signal combining portion 42 configured to combine together the received signals multiplied by the weights by the weight calculating portions 40, for obtaining a composite signal; an AM-demodulating portion 44 configured to demodulate the composite signal received from the received-signal combining portion 42, according to the AM method, for obtaining an AM-demodulated wave; an FSK-decoding portion 46 configured to decode the AM-demodulated wave received from the AM-demodulating portion 44, according to an FSK decoding method, for obtaining a decoded signal; a reply-bit-row interpreting portion 48 configured to interpret the decoded signal received from the FSK-decoding portion 46, for reading an information signal modulated by the radio-frequency tag 14; a received-signal-strength determining portion 50 configured to detect the strength of the composite received signal, on the basis of the AM-demodulated wave received from the AM-demodulating portion 44; the above-indicated weight control portion 52 which is configured to control the weights to be given to the respective weight multiplying portions 40, and which includes a PAA weight control portion 54 configured to control the PAA weights (phased array antenna weights) and an AAA weight control portion 56 configured to control the AAA weights (adaptive array antenna weights); a reference-signal generating portion 58 configured to generate a reference signal to be supplied to the AAA weight control portion 56; and a directivity control switching portion 60 configured to select one of the PAA weight control portion 54 and AAA weight control portion 56 from which the weights are given to the weight multiplying portions 40. In the radio-frequency tag communication device 12 constructed as described above, the radio-frequency receiver device 62 indicated above is constituted by the receiver antenna elements 26, down converters 28, received-signal A/D converting portions 30, memory portion 32, weight multiplying portions 40, received-signal combining portion 42, AM-demodulating portion 44, FSK-decoding portion 46, reply-bit-row interpreting portion 48, received-signal-strength determining portion 50, weight control portion 52 (including the PAA and AAA weight control portions 54, 56), reference-signal generating portion 58 and directivity control switching portion 60.

Figure 3:
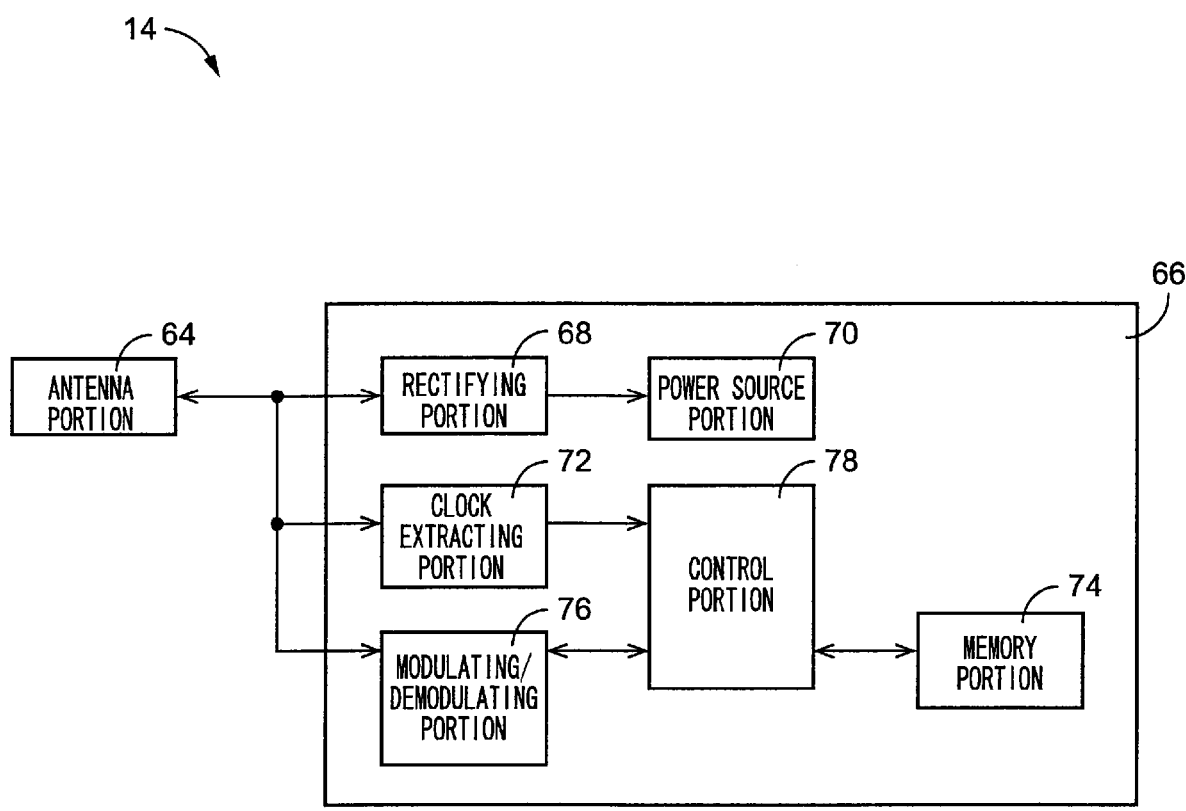
FIG. 3 is a block diagram showing an arrangement of a circuit element of a communication object in the form of a radio-frequency tag from which the radio-frequency receiver device receives a reply signal.

Referring further to the block diagram of FIG. 3, there is shown an arrangement of a circuit element 63 of the radio-frequency tag 14. As shown in FIG. 3, the circuit element 63 includes an antenna portion 64 for signal transmission and reception to and from the radio-frequency tag communication device 12, and an IC-circuit portion 66 configured to process the signal received by the antenna portion 64. The IC-circuit portion 66 has functional portions including: a rectifying portion 68 configured to rectify the interrogating wave Fc received from the radio-frequency communication device 12 through the antenna portion 64; a power source portion 70 configured to store an energy of the interrogating wave Fc rectified by the rectifying portion 68; a clock extracting portion 72 configured to extract a clock signal from the carrier wave of the interrogating wave Fc received by the antenna portion 64, and to apply the extracted clock signal to a control portion 78; a memory portion 74 functioning as an information storage portion configured to store desired information; a modulating/demodulating portion 76 connected to the antenna portion 64 and configured to effect modulation and demodulation of signals; and the above-indicated control portion 78 configured to control the circuit element 63 through the rectifying portion 68, clock extracting portion 72 and modulating/demodulating portion 76. The control portion 78 is arranged to implement basing control operations such as an operation to store the desired information in the memory portion 74 through radio communication with the radio-frequency tag communication device 12, and an operation to command the modulating/demodulating portion 76 to modulate the interrogating wave Fc received by the antenna portion 64, on the basis of the information signal stored in the memory portion 74, for generating the reply wave Fr to be transmitted from the antenna portion 64 toward the radio-frequency tag communication device 12.

Referring back to the block diagram of FIG. 2, it will be understood that the PAA weight control portion 54 functions as a phased-array control portion configured to perform a phased array antenna control for controlling the directivity of reception of the received signals by the plurality of receiver antenna elements 26, while the AAA weight control portion 56 functions as an adaptive-array control portion configured to perform an adaptive array antenna control for controlling the directivity of reception of the received signals by the receiver antenna elements 2y. It will also be understood that the received-signal-strength determining portion 50 functions as a received-signal-quality determining portion configured to determine whether the received signals received by the receiver antenna elements 26 have a desired quality, that is, whether the quality of the received signals is higher than a predetermined threshold.

The directivity control switching portion 60 is arranged to first enable the PAA weight control portion 54 to operate so that the directivity of reception of the received signals is controlled first by the phased array antenna control. If a negative determination is obtained by the received-signal-strength determining portion 50 after the phased array antenna control by the PAA weight control portion 54, that is, if the quality of the received signals is not higher than the predetermined threshold after the phased array antenna control, the directivity control switching portion 60 then enables the AAA weight control portion 56 to operate so that the directivity of reception of the received signal is controlled by the adaptive array antenna control. In other words, the PAA weight control portion 54 is first selected to control the directivity of reception of the received signals, and the AAA weight control portion 56 is selected only where the strength of the AM-demodulated signal is not higher than a predetermined threshold.

The AAA weight control portion 56 is preferably arranged to determine the initial values of the AAA weights to be given to the received signals received by the respective receiver antenna elements 26, on the basis of a result of the phased array antenna control by the PAA weight control portion 54. For instance, the AAA weight control portion 56 determines the initial values of the AAA weights which correspond to a direction in which the strength of the AM-modulated signal detected by the received-signal-strength determining portion 50 is the highest as a result of the phased array antenna control by the PAA weight control portion 54.

Referring to the flow chart of FIG. 4, there will be described a radio-frequency tag communication control routine executed by the DSP 16 of the radio-frequency tag communication device 12, for radio communication with the radio-frequency tag 14. This control routine is repeatedly executed with a predetermined cycle time.

Figure 4:
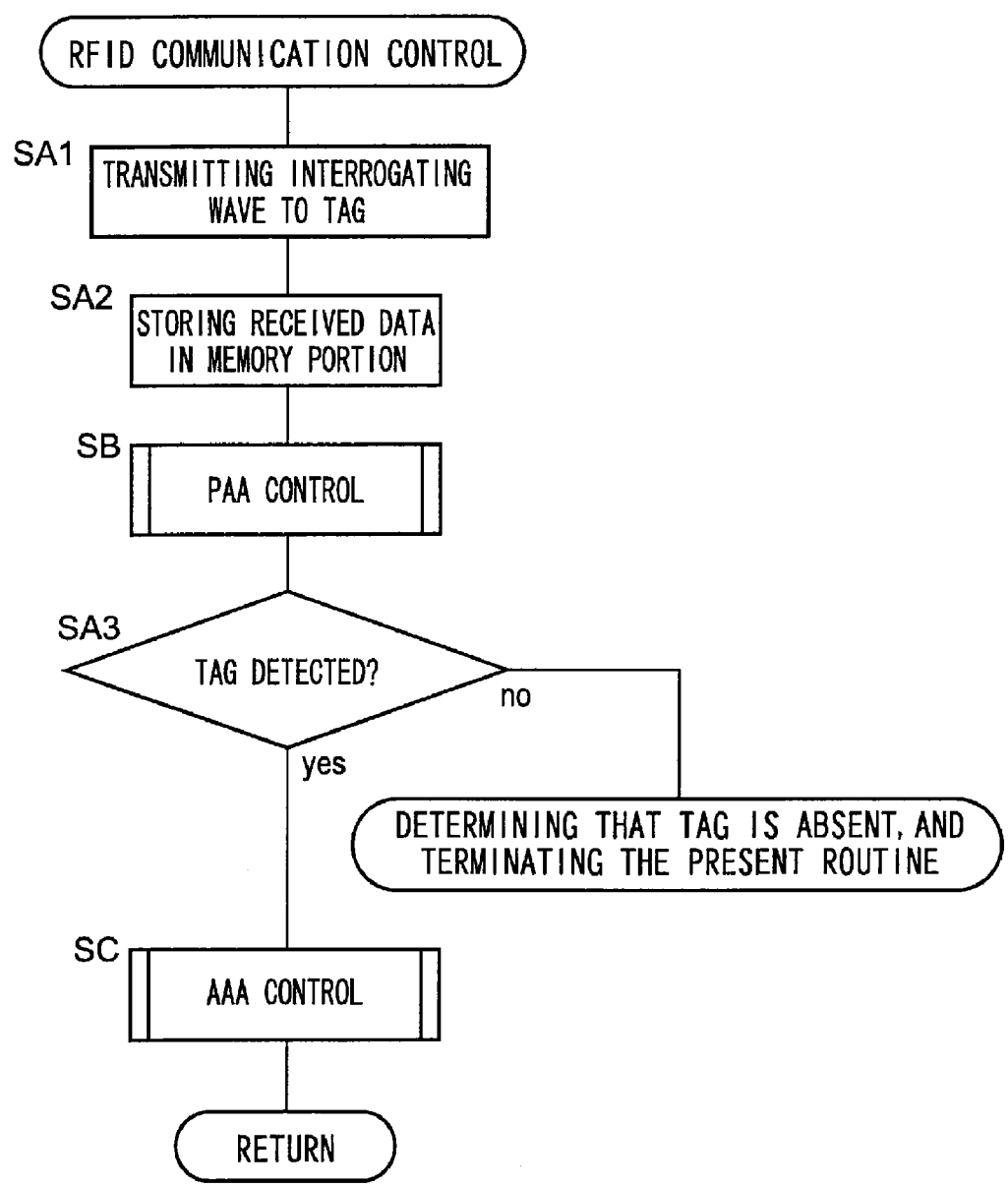
FIG. 4 is a flow chart illustrating a radio-frequency tag communication control routine executed by a DSP of the radio-frequency tag communication device of FIG. 2, to effect radio communication with the radio-frequency tag of FIG. 3.

The radio-frequency tag communication control routine of FIG. 4 is initiated with step SA1 in which the row of command bits for the transmitted signal to be transmitted to the radio-frequency tag 14 is generated, and is encoded according to the FSK encoding method and demodulated according to the AM method, into the demodulated signal which is transmitted as the interrogating wave Fc from the transmitter antenna element 24 toward the radio-frequency tag 14, through the transmitted-signal D/A converting portion 18 and the up converter 22. Then, the control flow goes to step SA2 in which the reply wave Fr transmitted from the radio-frequency tag 14 in response to the interrogating wave Fc transmitted in step SA1 is received by the plurality of receiver antenna elements 26, and stored into the memory portion 32 through the down converters 28 and the received-signal A/D converting portions 30. The control flow then goes to step SB to perform the PAA control illustrated in the flow chart of FIG. 5, and to step SA3 to determine whether the desired radio-frequency tag 14 has been detected as the desired communication object. If a negative determination is obtained in step SA3, this indicates that no radio-frequency tag 14 has been detected. In this case, the present control routine is terminated. If an affirmative decision is obtained in step SA3, the control flow goes to step SC to perform the AAA control illustrated in the flow chart of FIG. 6.

Figure 5:
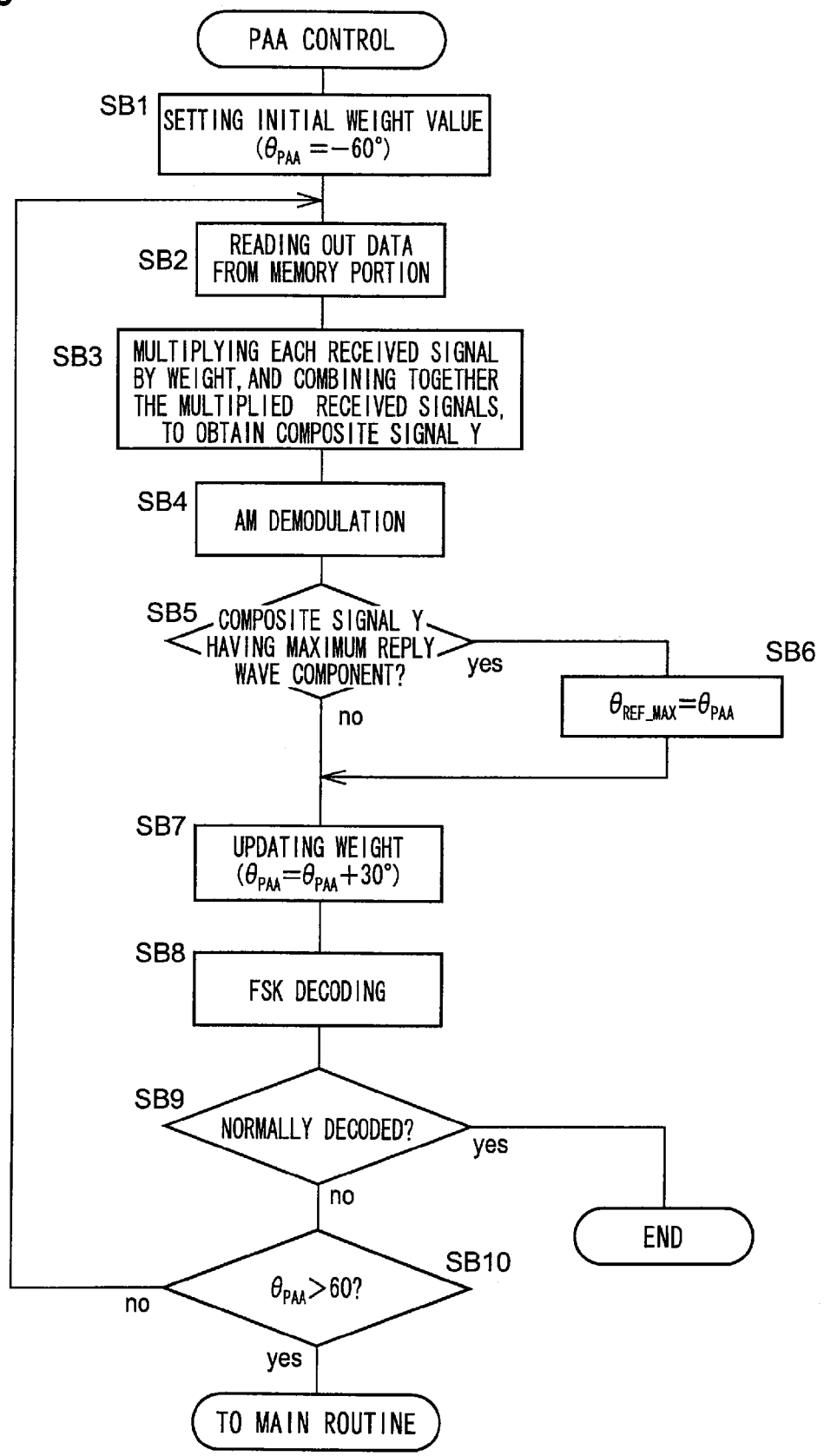
FIG. 5 is a flow chart illustrating a PAA control implemented in step SB of the radio-frequency tag communication control routine of FIG. 4.

The flow chart of FIG. 5 illustrates a PAA (phased array antenna) control routine executed in step SB of the radio-frequency tag communication control routine of FIG. 4. This PAA control routine is initiated with step SB1 to set the PAA weight $\theta_{PAA}$ to a predetermined initial value of $-60[°]$. Then, the control flow goes to step SB2 to read out the received signal which was received by each of the receiver antenna elements 26 and which has been stored in the memory portion 32 in step SA2 of FIG. 4.

Step SB2 is followed by step SB3 to multiply the received signal read out from the memory portion 32, by the PAA weight, and combine together the received signals multiplied by the PAA weight, to obtain a composite signal Y which is an output of the received-signal combining portion 42. The control flow then goes to step SB4 in which the composite signal Y received from the received-signal combining portion 42 is demodulated by the AM-demodulating portion 44. Step SB4 is followed by step SB5 to determine whether the composite signal Y obtained in step SB3 has the maximum reply wave component (reflected wave component). If an affirmative determination is obtained in step SB5, the control flow goes to step SB6 in which an angle $\theta_{REF\_MAX}$ indicative of a direction toward the radio-frequency tag 14 is set to $\theta_{PAA}$. Step SB6 is followed by step SB7. If a negative determination is obtained in step SB5, the control flow goes directly to step SB7 to increment the PAA weight $\theta_{PAA}$ by 30[°], and to step SB8 in which the demodulated signal received from the AM-demodulating portion 44 is decoded by the FSK-decoding portion 46. Then, the control flow goes to step SB9 in which the reply-bit-row interpreting portion 48 determines whether the demodulated signal has been normally decoded in step SB8. If an affirmative determination is obtained in step SB9, the present PAA control routine is terminated. If a negative determination is obtained in step SB9, the control flow goes to step SB10 to determine whether the PAA weight $\theta_{PAA}$ is larger than 60[°]. If a negative determination is obtained in step SB10, the control flow goes back to step SB2 and the subsequent steps. If an affirmative determination is obtained in step SB10, the control flow goes to step SA3 of the radio-frequency tag communication control routine of FIG. 4. It will be understood that a portion of the DSP 16 assigned to implement the steps SB5 and SB6 constitutes the received-signal-strength determining portion 50, and a portion of the DSP 16 assigned to implement the step SB9 constitutes the directivity control switching portion 60, while a portion of the DSP 16 assigned to implement the steps SB1, SB7 and SB10 constitutes the PAA weight control portion 54.

Figure 6:
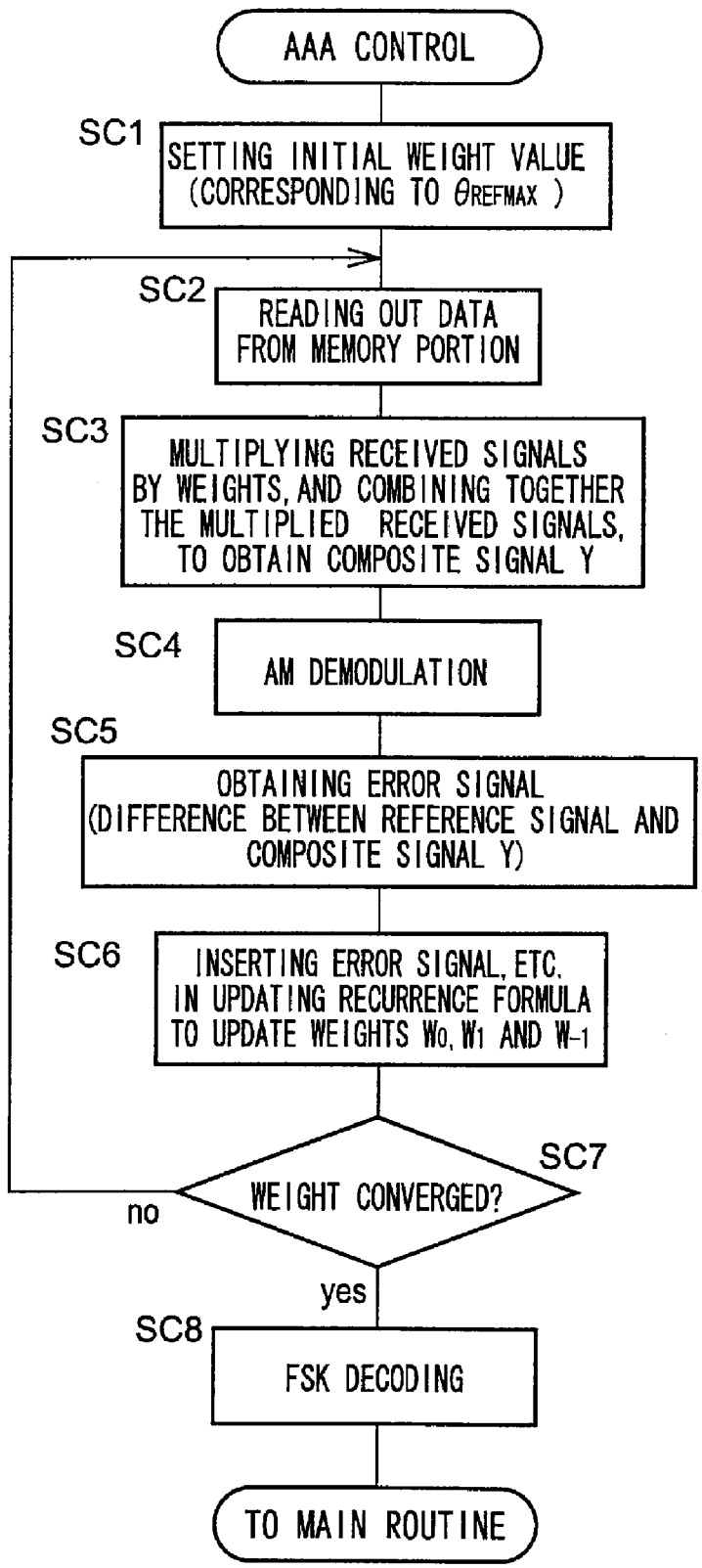
FIG. 6 is a flow chart illustrating an AAA control implemented in step SC of the radio-frequency tag communication control routine of FIG. 4.

The flow chart of FIG. 6 illustrates an AAA (adaptive array antenna) control routine executed in step SC of the radio-frequency tag communication control routine of FIG. 4. This AAA control routine is initiated with step SC1 to set the AAA weight to an initial value corresponding to the angle $\theta_{REF\_MAX}$ set in step SB6 of the PAA control routine of FIG. 5. Then, the control flow goes to step SC2 to read out the received signal which was received by each of the receiver antenna elements 26 and which has been stored in the memory portion 32 in step SA2 of FIG. 4. Step SC2 is followed by step SC3 to multiply the received signal read out from the memory portion 32, by the AAA weight, and combine together the received signals multiplied by the AAA weights, to obtain the composite signal Y which is the output of the received-signal combining portion 42. The control flow then goes to step SC4 in which the composite signal Y received from the received-signal combining portion 42 is demodulated by the AM-demodulating portion 44. Step SC4 is followed by step SC5 to obtain an error signal representative of an error between the reference signal generated by the reference-signal generating portion 58 and the composite signal Y obtained in step SC3. The control flow then goes to step SC6 to insert the error represented by the error signal obtained in step SC5, in an updating recurrence formula (e.g., RLS algorithm) used to update the weights $W_0$, $W_1$ and $W_{-1}$ to be given to the respective weight multiplying portions 40.

Then, the control flow goes to step SC7 to determine whether the weights calculated in step SC6 have been stabilized or converged. If a negative determination is obtained in step SC7, the control flow goes back to step SC2 and the subsequent steps. If an affirmative determination is obtained in step SC7, the control flow goes to step SC8 in which the demodulated signal generated by the AM-demodulating portion 44 is decoded by the FSK-decoding portion 46, and the radio-frequency tag communication control routine of FIG. 4 is terminated. It will be understood that a portion of the DSP 16 assigned to implement the steps SC1, SC5 and SC7 constitutes the AAA weight control portion 56.

As described above, the radio-frequency receiver device 62 constructed according to the present first embodiment of this invention described above includes the PAA weight control portion 54 (steps SB1, SB7 and SB10) configured to perform the phased array antenna control for controlling the directivity of reception of the received signals by the plurality of receiver antenna elements 26, the AAA weight control portion 56 (steps SC1, SC5 and SC7) configured to perform the adaptive array antenna control for controlling the directivity of reception of the received signals by the receiver antenna elements 26, the received-signal-quality determining portion in the form of the received-signal-strength determining portion 50 (steps SB5 and SB6) configured to determine whether the received signals received by the receiver antenna elements 26 have a quality higher than a predetermined threshold, and the directivity control switching portion 60 (step SB9) configured to first enable the PAA weight control portion 54 to perform the phased array antenna control for controlling the directivity of reception, and to enable the AAA weight control portion 56 to perform the adaptive array antenna control for controlling the directivity of reception, only if a negative determination is obtained by the received-signal-quality determining portion. Thus, the adaptive array antenna control is performed only when this control is necessary, so that the time required for processing the received signals can be shortened, without unnecessary calculation for the adaptive array antenna control. Accordingly, the present receiver antenna device 62 is capable of efficiently controlling the directivity of reception of the receiver antenna elements 26.

The present first embodiment is further arranged such that the AAA weight control portion 56 determines the initial values of the weights to be respectively given to the received signals received by the respective receiver antenna elements 26, on the basis of a result of the adaptive array antenna control by the PAA weight control portion 54. Accordingly, the time required for the adaptive array antenna control can be shortened.

The present first embodiment is further arranged such that the received-signal-strength determining portion 50 configured to determine whether the strength of the received signals is higher than the predetermined threshold functions as the received-signal-quality determining portion, and such that the directivity control switching portion 60 enables the AAA weight control portion 56 when a negative determination is obtained by the received-signal-strength determining portion 50. Thus, the quality of the received signals can be accurately evaluated on the basis of the strength or intensity of the received signals.

In the communication system 10 described above, the communication object takes the form of the radio-frequency tag 14 arranged to transmit the reply wave Fr in response to the transmitted signal in the form of the interrogating wave Fc transmitted from the radio-frequency tag communication device 12, which includes the radio-frequency receiver device 62 capable of efficient control of the directivity of reception of the received signals by the receiver antenna elements 26.

Other embodiments of this invention will be described in detail by reference to FIGS. 7-25. In the following embodiments, the same reference signs as used in the first embodiment will be used to identify the same elements, which will not be described.

Embodiment 2

Figure 7:
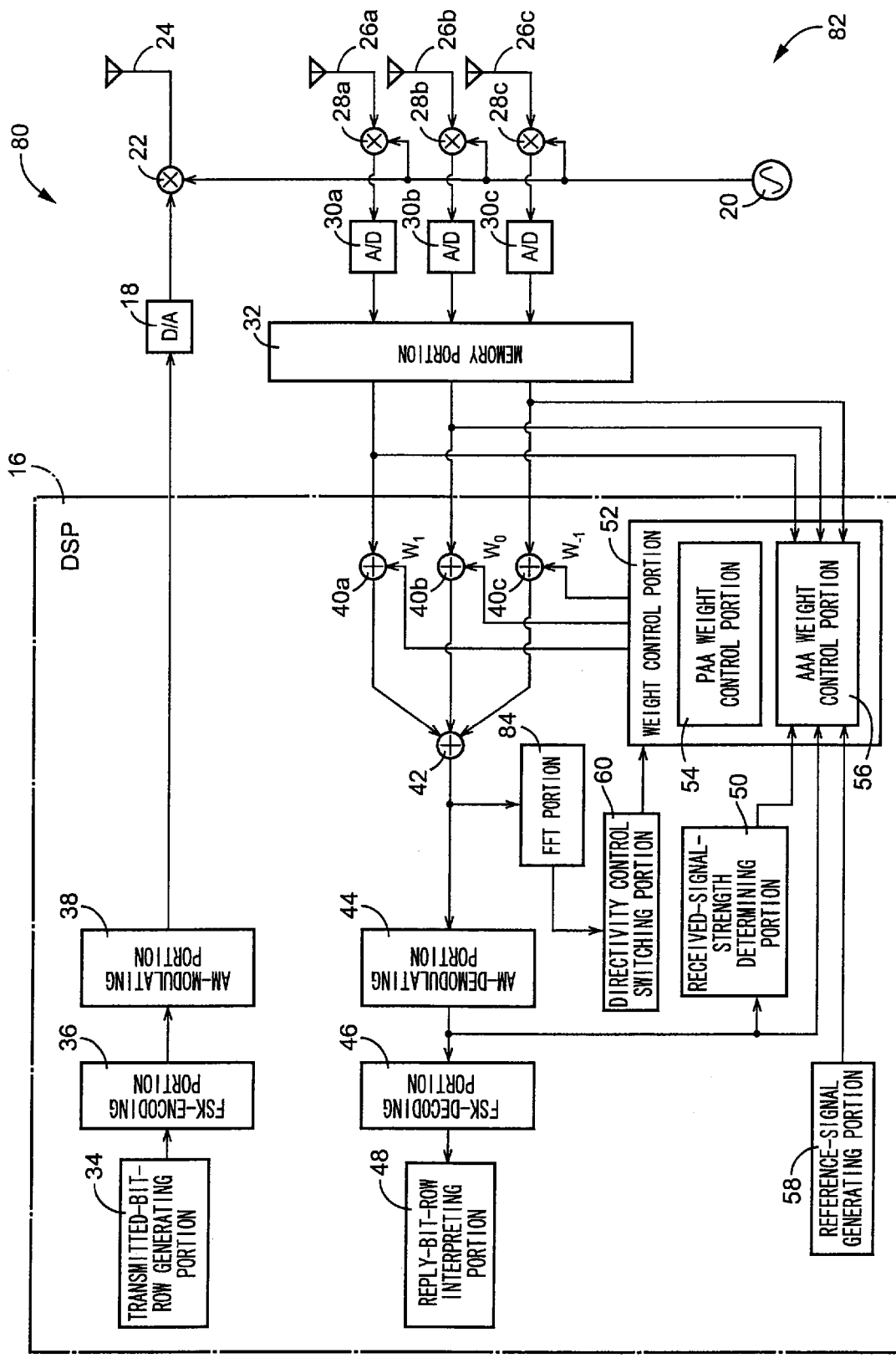
FIG. 7 is a block diagram showing an arrangement of a radio-frequency tag communication device provided with a radio-frequency receiver device constructed according to a second embodiment of this invention.

Referring to the block diagram of FIG. 7, there is shown an arrangement of a radio-frequency tag communication device 80 including a radio-frequency receiver device 82 constructed according to a second embodiment of the present invention. As shown in FIG. 7, the DSP 16 of the radio-frequency tag communication device 80 includes an interfering-wave determining portion in the form of an FFT (fast Fourier transformation) portion 84 configured to determine whether the composite signal generated by the received-signal combining portion 42 includes an interfering wave component. On the basis of a determination by this FFT portion 84, the directivity control switching portion 60 enables one of the PAA weight control portion 54 and the AAA weight control portion 56, to control the corresponding PAA weights or AAA weights to be given to the weight multiplying portions 40. It will be understood that the FFT portion 84 functions as the received-signal-quality determining portion configured to determine whether the quality of the received signals is higher than the predetermined threshold.

Figure 8:
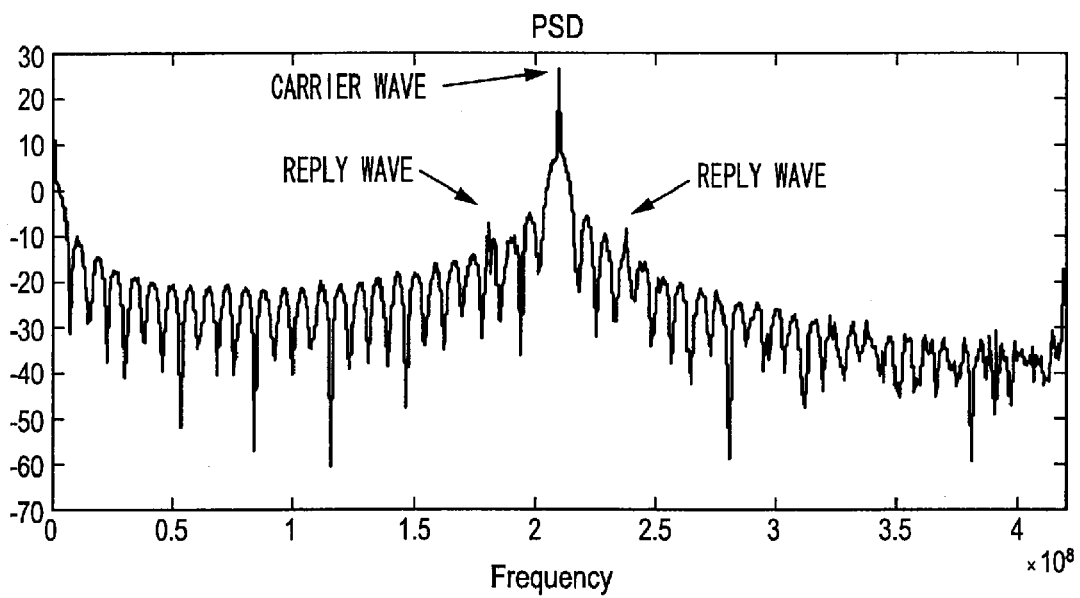
FIG. 8 is a view indicating a relationship between the frequency and strength of a composite signal generated by a received-signal combining portion of the radio-frequency tag communication device of FIG. 7, where the composite signal does not include an interfering wave component.
Figure 9:
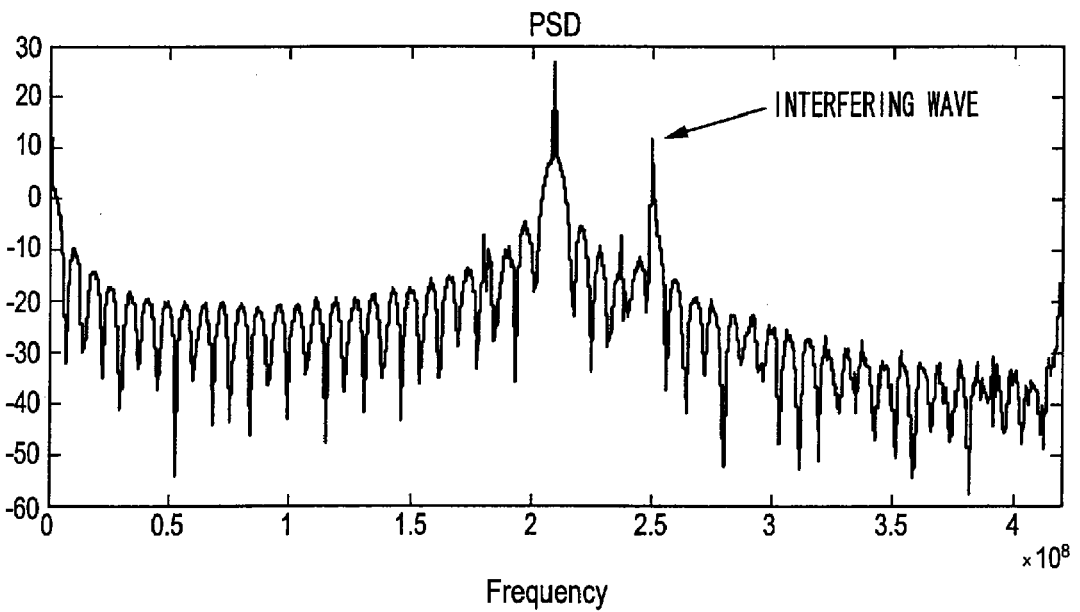
FIG. 9 is a view indicating a relationship between the frequency and strength of the composite signal, where the composite signal includes the interfering wave component.

FIG. 8 indicates a relationship between the frequency and strength of the composite signal generated by the received-signal combining portion 42, where a negative determination is obtained by the FFT portion 84, that is, where the composite signal does not include the interfering wave component. This relationship was obtained by an experimental simulation conducted by the present inventors. As indicated in FIG. 8, the composite signal not including the interfering wave component has frequency components having peaks corresponding to only the carrier wave of the interrogating wave Fc and the reply wave (reflected wave) Fr received from the radio-frequency tag 14. On the other hand, FIG. 9 indicates the relationship where an affirmative determination is obtained by the FFT portion 86, that is, where the composite signal generated by the received-signal combining portion 42 includes the interfering wave component. As shown in FIG. 9, the composite signal including the interfering wave component has not only the frequency components having peaks corresponding to the carrier wave and the reply wave Fr, but also a frequency component having a peak irrespective of the carrier wave and reply wave Fr.

The directivity control switching portion 60 first enables the PAA weight control portion 54 to perform the phased array antenna control for controlling the directivity of reception of the received signals, and enables the AAA weight control portion 56 to perform the adaptive array antenna control for controlling the directivity of reception only if the affirmative determination is obtained by the FFT portion 84 after the phased array antenna control by the PAA weight control portion 54. In other words, the directivity of reception of the received signals by the receiver antenna elements 26 is first controlled by the phased array antenna control by the PAA weight control portion 54. Only if it is determined that the received signals (composite signal Y) cannot be normally decoded, then the directivity of reception is controlled by the adaptive array antenna control by the AAA weight control portion 56.

Figure 10:
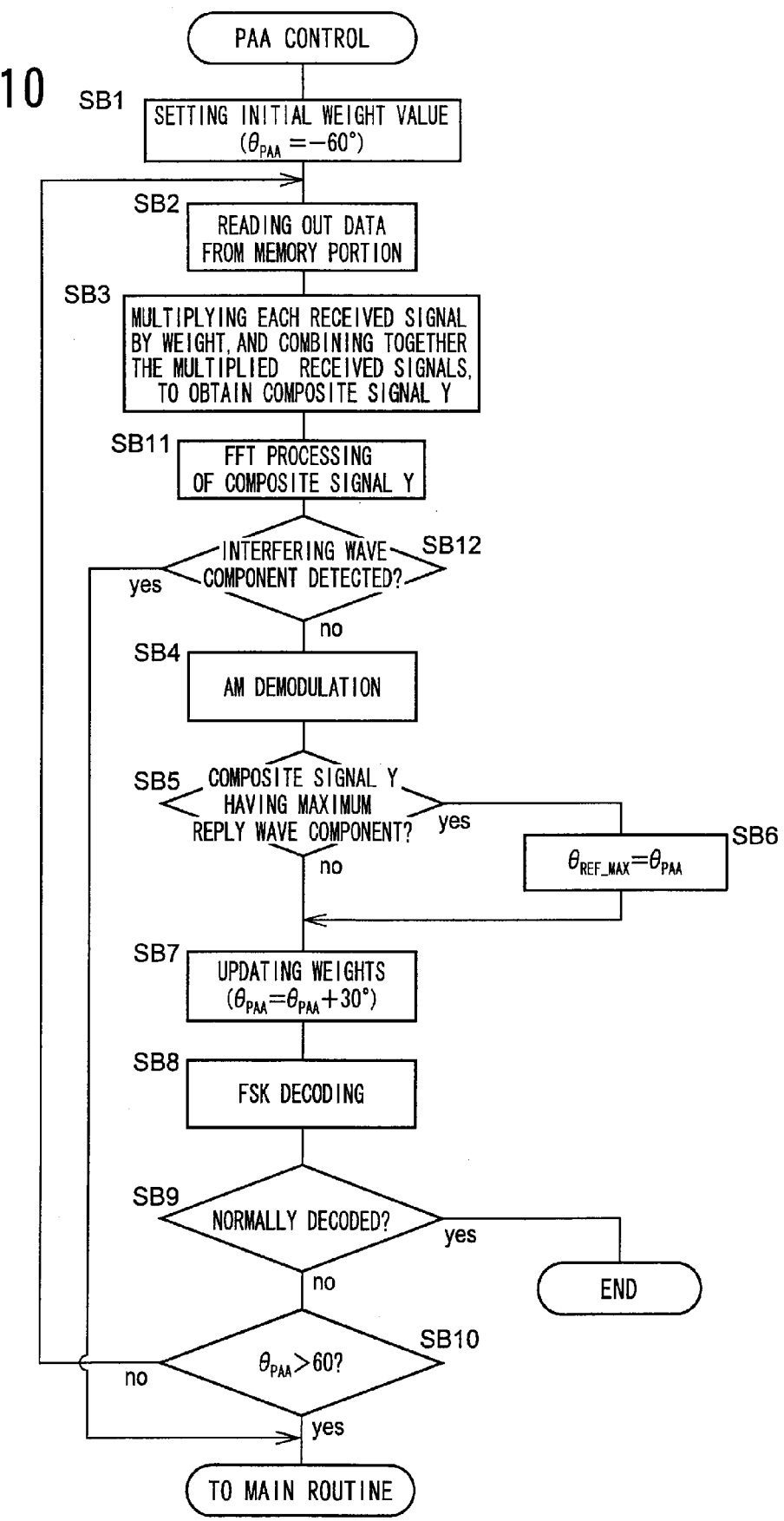
FIG. 10 is a flow chart illustrating a PAA control in a radio-frequency tag communication control routine executed by a DSP of the radio-frequency tag communication device of FIG. 7, to effect radio communication with the radio-frequency tag of FIG. 3.

The flow chart of FIG. 10 illustrates a PAA (phased array antenna) control routine executed by the DSP 16 of the radio-frequency tag communication device 80, in the radio communication with the radio-frequency tag 14 according to the radio-frequency tag communication control routine of FIG. 4. This PAA control routine of FIG. 10 corresponds to the PAA control routine of FIG. 5. It is noted that the AAA (adaptive array antenna) control routine in this second embodiment is identical with that illustrated in the flow chart of FIG. 6. The same reference signs as used in FIG. 5 will be used in FIG. 10 to identify the same steps, which will not be described.

In the PAA control routine of FIG. 10, step SB3 is followed by step SB11 to perform an FFT processing of the composite signal Y generated by the received-signal combining portion 42. Then, the control flow goes to step SB12 to determine whether an interfering wave component included in the composite signal Y has been detected. If a negative determination is obtained in step SB12, the control flow goes to step SB4 and the subsequent steps as described by reference to the flow chart of FIG. 5. If an affirmative determination is obtained in step SB12, on the other hand, the control flow goes back to the radio-frequency tag communication control routine of FIG. 4, that is, goes to step SA3 and the subsequent steps. It will be understood that a portion of the DSP 16 assigned to implement steps SB11 and SB12 constitutes the FFT portion 84, while a portion of the DSP 16 assigned to implement step SB1 constitutes the directivity control switching portion 60.

In the second embodiment described above, the received-signal-quality determining portion is provided by the FFT portion 84 (steps SB11 and SB12) configured to determine whether the received signals include an interfering wave. The negative determination is obtained by the received-signal-quality determining portion when an affirmative determination is obtained by the FFT portion 84 which functions as the interfering-wave determining portion. That is, the determination that the quality of the received signals is not higher than the predetermined threshold is obtained when the FFT portion 84 determines that the received signals include the interfering wave.

Embodiment 3

Figure 11:
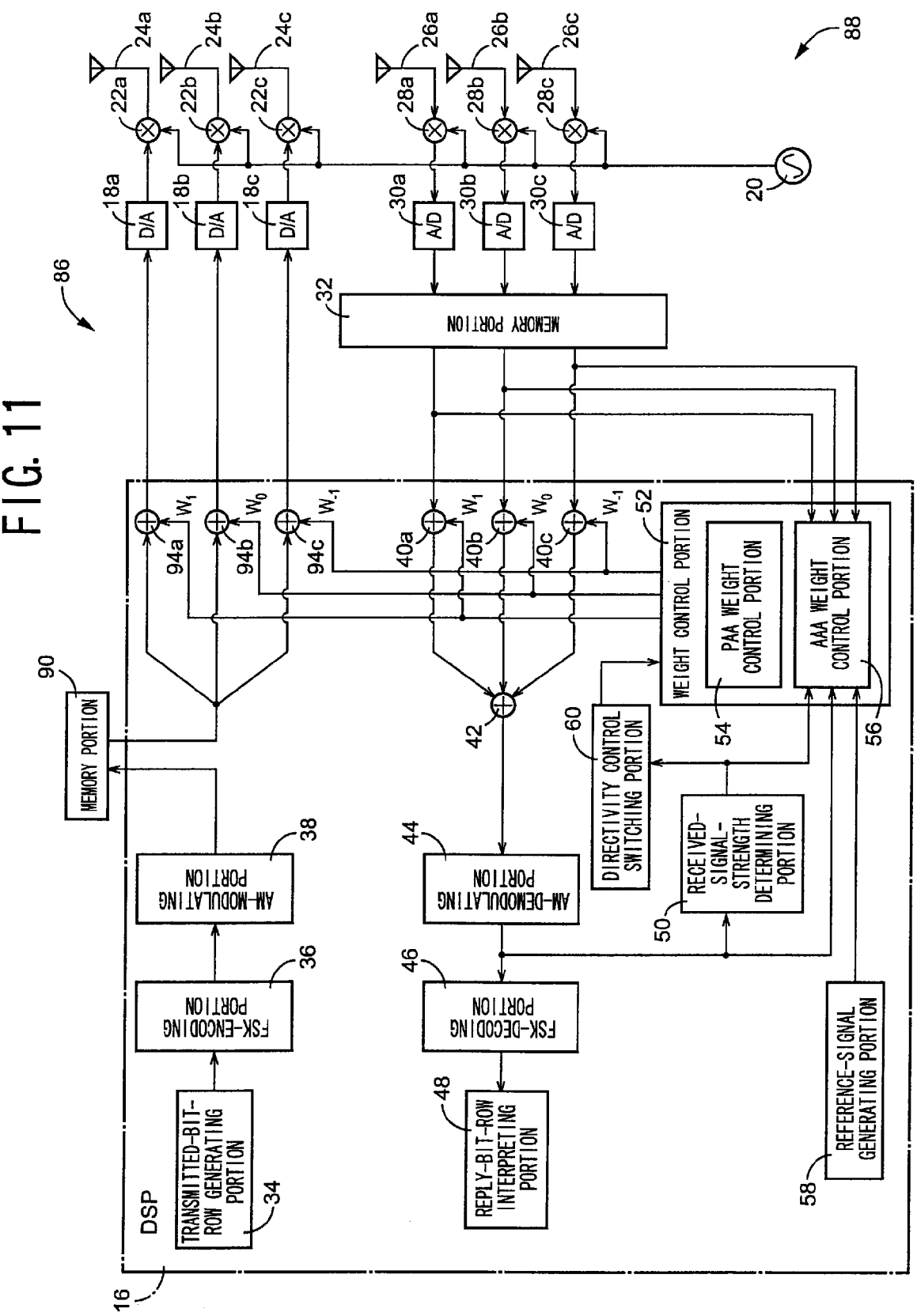
FIG. 11 is a block diagram showing an arrangement of a radio-frequency tag communication device provided with a radio-frequency receiver device constructed according to a third embodiment of this invention.

Referring to the block diagram of FIG. 11, there is shown an arrangement of a radio-frequency tag communication device 86 including a radio-frequency receiver device 88 constructed according to a third embodiment of this invention. As shown in FIG. 11, the radio-frequency tag communication device 88 includes: a memory portion 90 configured to store the transmitted signal modulated by the AM-modulating portion 38, and to supply the stored transmitted signal to the DSP 16 according to a command received from the DSP 16; a plurality of transmitted-signal D/A converting portions (three converting portions 18*a*, 18*b*, 18*c* in the example of FIG. 11, which are hereinafter collectively referred to as "transmitted-signal D/A converting portions 18", unless otherwise specified) configured to convert the transmitted signals the directivities of which have been controlled by the DSP 16, into analog signals; a plurality of up converters (three up converters 22*a*, 22*b*, 22*c* in the example of FIG. 11, which are hereinafter collectively referred to as "up converters 22", unless otherwise specified) configured to increase the frequencies of the analog transmitted signals by an amount corresponding to the frequency of the frequency converting signal generated by the frequency-converting-signal generating portion 20; and a plurality of transmitter antenna elements (three transmitter antenna elements 24*a*, 24*b*, 24*c* in the example of FIG. 11, which are hereinafter collectively referred to as "transmitter antenna elements 24", unless otherwise specified) configured to transmit the analog transmitted signals (the frequencies of which have been increased by the up converters 22) as the interrogating wave Fc toward the radio-frequency tag 14. The DSP 16 includes a plurality of transmitter-side weight multiplying portions (three weight multiplying portions 94*a*, 84*b*, 94*c* in the example of FIG. 11, which are hereinafter collectively referred to as "transmitter-side weight multiplying portions 94", unless otherwise specified) configured to multiply the transmitted signal by the PAA weights or AAA weights calculated by the weight control portion 52. Thus, the radio-frequency tag communication device 86 is arranged to control not only the directivity of reception of the received signals by the receiver antenna elements 26, but also the directivity of transmission of the transmitted signals from the transmitter antenna elements 24.

Figure 12:
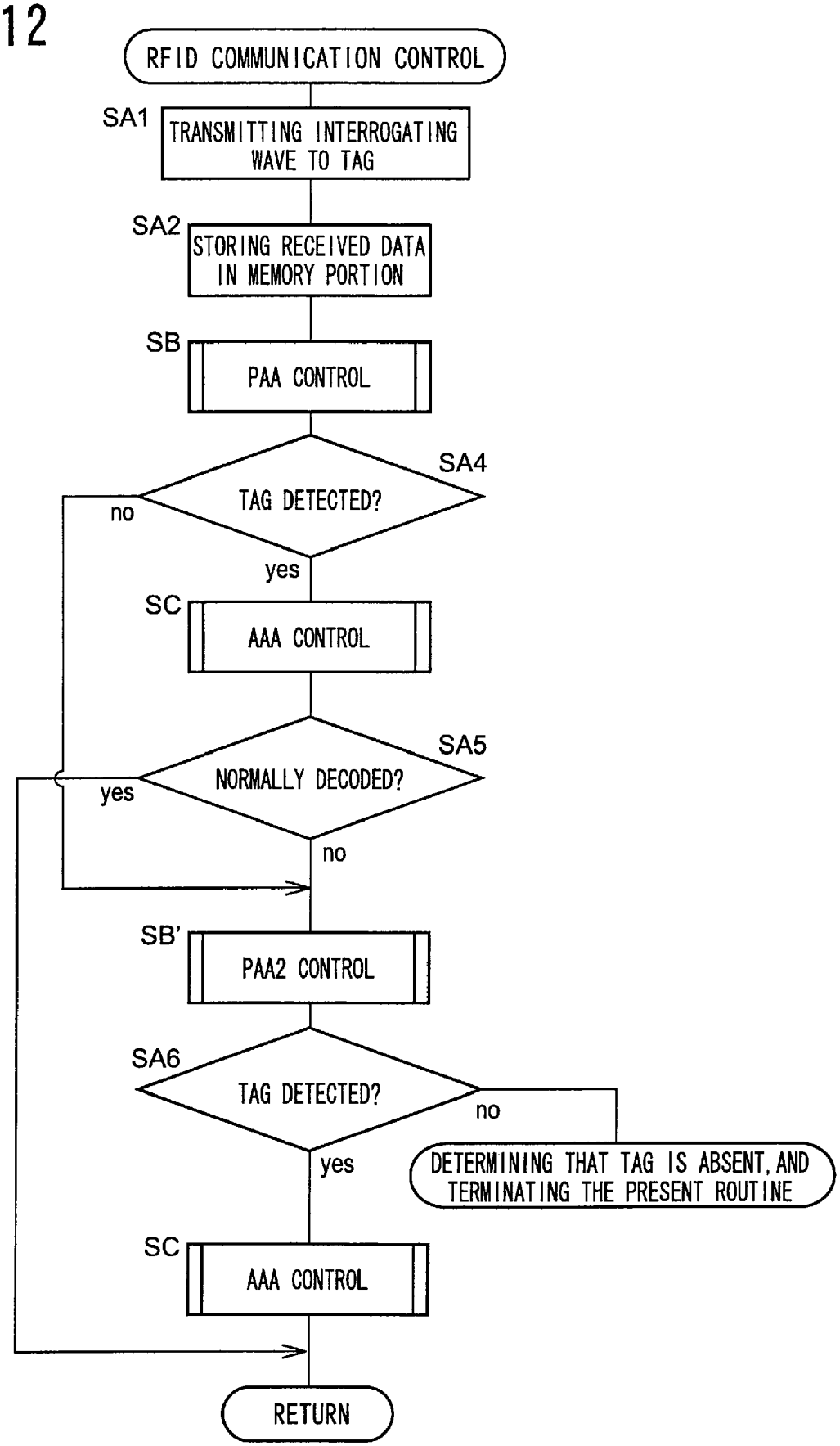
FIG. 12 is a flow chart illustrating a radio-frequency tag communication control routine executed by a DSP of the radio-frequency tag communication device of FIG. 11, to effect radio communication with the radio-frequency tag of FIG. 3.

The flow chart of FIG. 12 illustrates a radio-frequency tag communication control routine executed by the DSP 16 of the radio-frequency tag communication device 86, for radio communication with the radio-frequency tag 14. The radio-frequency tag communication control routine of FIG. 12 corresponds to that of FIG. 4. The same reference signs as used in FIG. 4 will be used in FIG. 12 to identify the same steps, which will not be described.

In the radio-frequency tag communication control routine of FIG. 12, step SB to perform the PAA control is followed by step SA4 to determine whether the communication object in the form of the radio-frequency tag has been detected. If a negative determination is obtained in step SA4, the control flow goes to step SB' to perform a second PAA control according to a second PAA control routine illustrated in the flow chart of FIG. 13. If an affirmative determination is obtained in step SA4, the control flow goes to step SC to perform the AAA control according to the AAA control routine illustrated in the flow chart of FIG. 6. Step SC is followed by step SA5 in which the reply-bit-row interpreting portion 48 determines whether the demodulated signal received from the AM-demodulating portion 44 has been normally decoded by the FSK-decoding portion 46. If an affirmative determination is obtained in step SA4, the present control routine is terminated. If a negative determination is obtained in step SA5, the control flow goes to the above-indicated step SB' to perform the second PAA control according to the second PAA control routine of FIG. 13, and then goes to step SA6 to determine whether the radio-frequency tag 14 has been detected. If a negative determination is obtained in step SA6, this indicates that no radio-frequency tag 14 has been detected. In this case, the present control routine is terminated. If an affirmative decision is obtained in step SA6, the control flow goes to step SC to perform the AAA control illustrated in the flow chart of FIG. 6.

Figure 13:
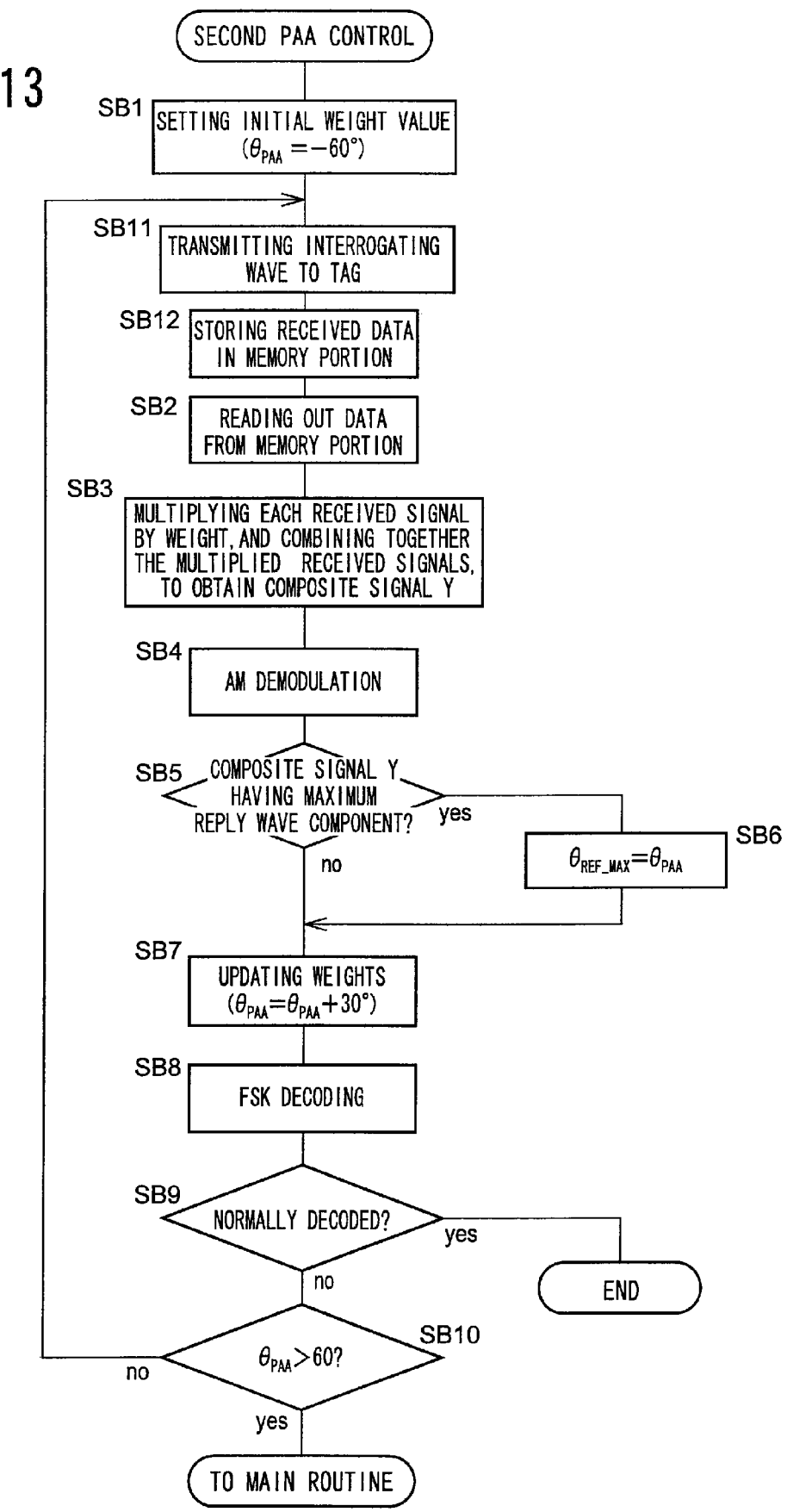
FIG. 13 is a flow chart illustrating a second PAA control in step SB7 of the radio-frequency tag communication control routine of FIG. 12.

The flow chart of FIG. 13 illustrates the second PAA control routine executed in step SB' of the radio-frequency tag communication control routine of FIG. 12. The same reference signs as used in FIG. 5 will be used in FIG. 13 to identify the same steps, which will not be described.

In the second PAA control routine of FIG. 13, step SB1 is followed by step SB11 in which the transmitted signal read out from the memory portion 90 is multiplied by the PAA weights calculated by the weight control portion 52, and the multiplied transmitted signals are transmitted as the interrogating wave Fc from the transmitter antenna elements 20 toward the radio-frequency tag 14 through the transmitted-signal D/A converting portions 18 and up converters 22. Step SB11 is followed by step SB12 in which the receiver antenna elements 26 receive the reply wave Fr transmitted from the radio-frequency tag 14 in response to the interrogating wave Fc transmitted in step SB11, and the received reply wave Fr is stored in the memory portion 32 through the down converters 28 and received-signal A/D converting portions 30. Then, the control flow goes to step SB2 and the subsequent steps described by reference to the flow chart of FIG. 5.

In the radio-frequency tag communication device 86 according to the present third embodiment, the PAA control and the AAA control are performed for the received signals received by the receiver antenna elements 26, while the directivity of transmission of the transmitted signals from the transmitter antenna elements 24 is set at its initial value. If the reply signal received from the radio-frequency tag 14 is not normally or adequately decoded, the directivity of transmission and the directivity of reception are controlled by the PAA weight control portion 54. Further, if the negative determination is obtained by the received-signal-quality determining portion, the AAA weight control portion 56 is enabled to control the directivity of transmission and the directivity of reception. Accordingly, the radio communication with the radio-frequency tag 14 can be adequately effected by the radio-frequency tag communication device 86.

Embodiment 4

Figure 14:
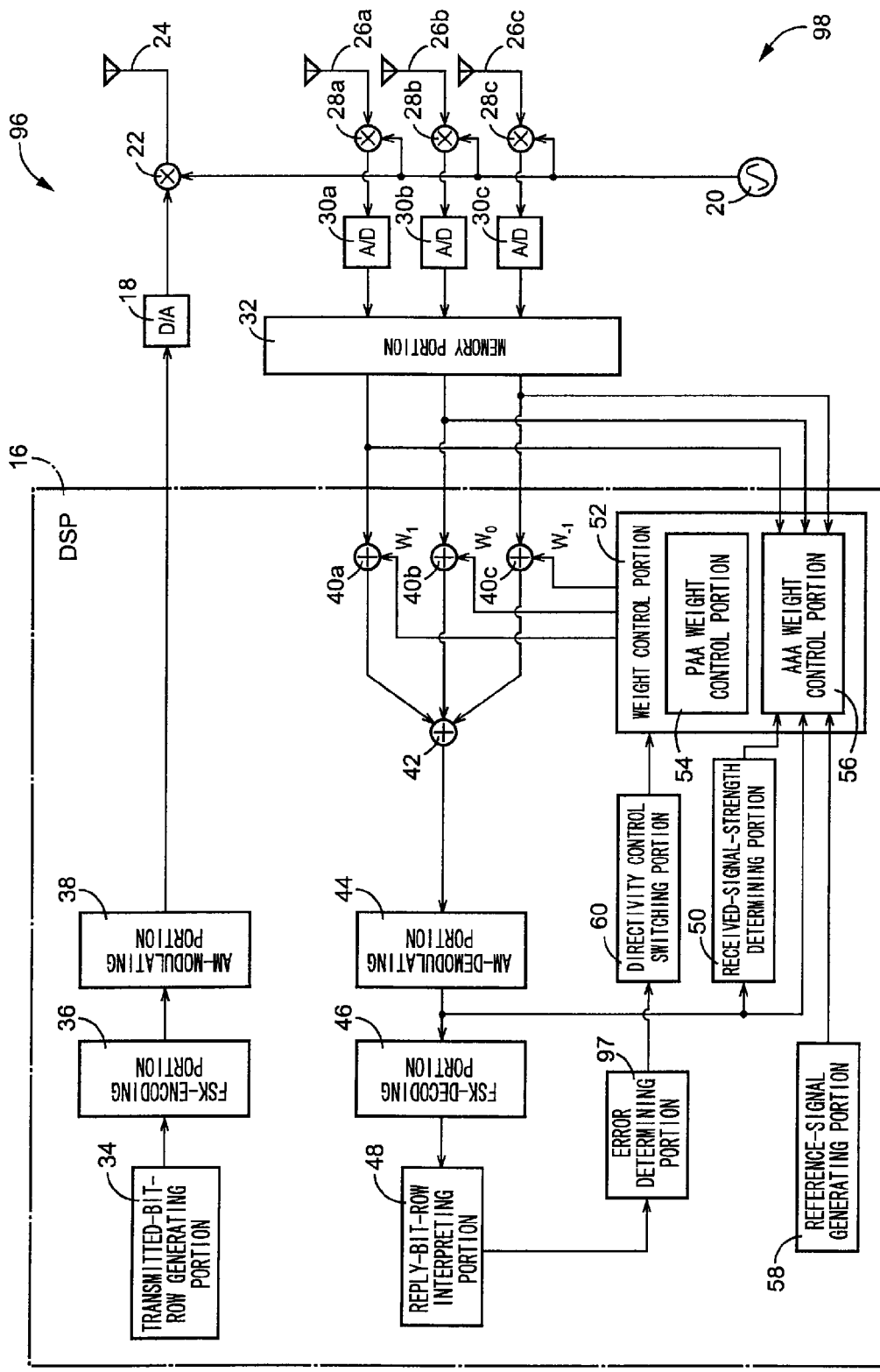
FIG. 14 is a block diagram showing an arrangement of a radio-frequency tag communication device provided with a radio-frequency receiver device constructed according to a fourth embodiment of this invention.

Referring next to the block diagram of FIG. 14, there is shown an arrangement of a radio-frequency tag communication device 96 including a radio-frequency receiver device 98 constructed according to a fourth embodiment of this invention. As shown in FIG. 14, the DSP 16 of the radio-frequency tag communication device 96 includes an error determining portion 97 configured to determine whether the quality of the decoded signal generated by the FSK-decoding portion 46 and interpreted by the reply-bit-row interpreting portion 48 is higher than a predetermined threshold On the basis of a determination by the error determining portion 97, the directivity control switching portion 60 enables one of the PAA weight control portion 54 and the AAA weight control portion 56 to apply the corresponding PAA weights or AAA weights to the weight multiplying portions 40. It will be understood that the error determining portion 97 functions as the received-signal-quality determining portion configured to determine whether the received signals received by the receiver antenna elements 26 have a quality higher than the predetermined threshold. Namely, the error determining portion 96 is arranged to determine whether the quality of the decoded signal as interpreted by the reply-bit-row interpreting portion 48 is higher than the predetermined threshold. If the quality of the decoded signal is not higher than the threshold, the error determining portion 97 determines that the quality of the received signals is not higher than the predetermined threshold.

The directivity control switching portion 60 first enables the PAA weight control portion 54 to perform the phased array antenna control for controlling the directivity of reception of the received signals, and enables the AAA weight control portion 56 to perform the adaptive array antenna control if the negative determination is obtained by the error determining portion 97 after the phased array antenna control by the PAA weight control portion 54. That is, if the received signals cannot be normally decoded after the phased array antenna control by the PAA weight control portion 54, the AAA weight control portion 56 is enabled to perform the adaptive array antenna control for controlling the directivity of reception of the received signals.

As described above, the radio-frequency receiver device 98 according to the fourth embodiment includes the FSK-decoding portion 46 configured to decode the received signals, and the received-signal-quality control portion comprises the error determining portion 97 configured to determine whether the quality of the decoded signal as interpreted by the reply-bit-row interpreting portion 48 is higher than the predetermined threshold. The negative determination by the received-signal-quality determining portion that the quality of the received signals is not higher than the predetermined threshold is obtained when the negative determination is obtained by the error determining portion 96. Accordingly, the quality of the received signals can be adequately evaluated in the fourth embodiment.

While the first through fourth embodiments of this invention have been described in detail, these embodiments may be modified as needed.

The preceding embodiments may be modified such that the determination by the received-signal-quality determining portion is made while the directivity of reception of the received signals by the plurality of receiver antenna elements 26 is set at its initial value, with none of the PAA weight control portion 54 and the AAA weight control portion 56 being enabled to operate, and such that if the negative determination is obtained by the received-signal-quality determining portion, the PAA weight control portion 54 is enabled to perform the phased array antenna control for controlling the directivity of reception of the received signals. This modification permits further reduction of the time required for processing the received signals, where the desired radio-frequency tag 14 is located comparatively near the radio-frequency tag communication device.

In the preceding embodiments, the received-signal-quality determining portion to determine whether the quality of the received signals received by the receiver antenna elements 26 is higher than the predetermined threshold is constituted by the received-signal-strength determining portion 50, the FFT portion 84 or the error determining portion 97. However, the received-signal-quality determining portion may comprise two or all of those three portions 50, 84, 97, and the directivity control switching portion 60 enables one of the PAA and AAA weight control portions 54, 56 on the basis of determinations of those two or three portions 50, 84, 97. Further, the received-signal-quality determining portion may be a portion other than the portions 50, 84, 97, for instance, a portion configured to determine whether the quality of the demodulated signal generated by the AM-demodulating portion 44 is higher than a predetermined threshold.

In the first through fourth embodiments, the received-signal-strength determining portion 50, weight control portion 52 (PAA weight control portion 54 and AAA weight control portion 56), directivity control switching portion 60, etc. are functional portions of the DSP 16. However, those portions may be provided by mutually separate control devices. Those functional portions or separate control devices may be controlled by either digital signal processing or analog signal processing.

In the preceding embodiments, the radio-frequency tag communication device 12, 80, 86, 96 use the transmitter antenna device (24) and the receiver antenna device (26) which are mutually separate devices. However, the radio-frequency tag communication device may use a transmitter/receiver antenna device (transmitter/receiver antenna elements) arranged to transmit the transmitted signal (interrogating wave Fc) and to receive the reply signal (reply wave Fr). In this case, the radio-frequency tag communication device 12, 80, 86, 96 may be made simpler in construction.

Embodiment 5

Figure 15:
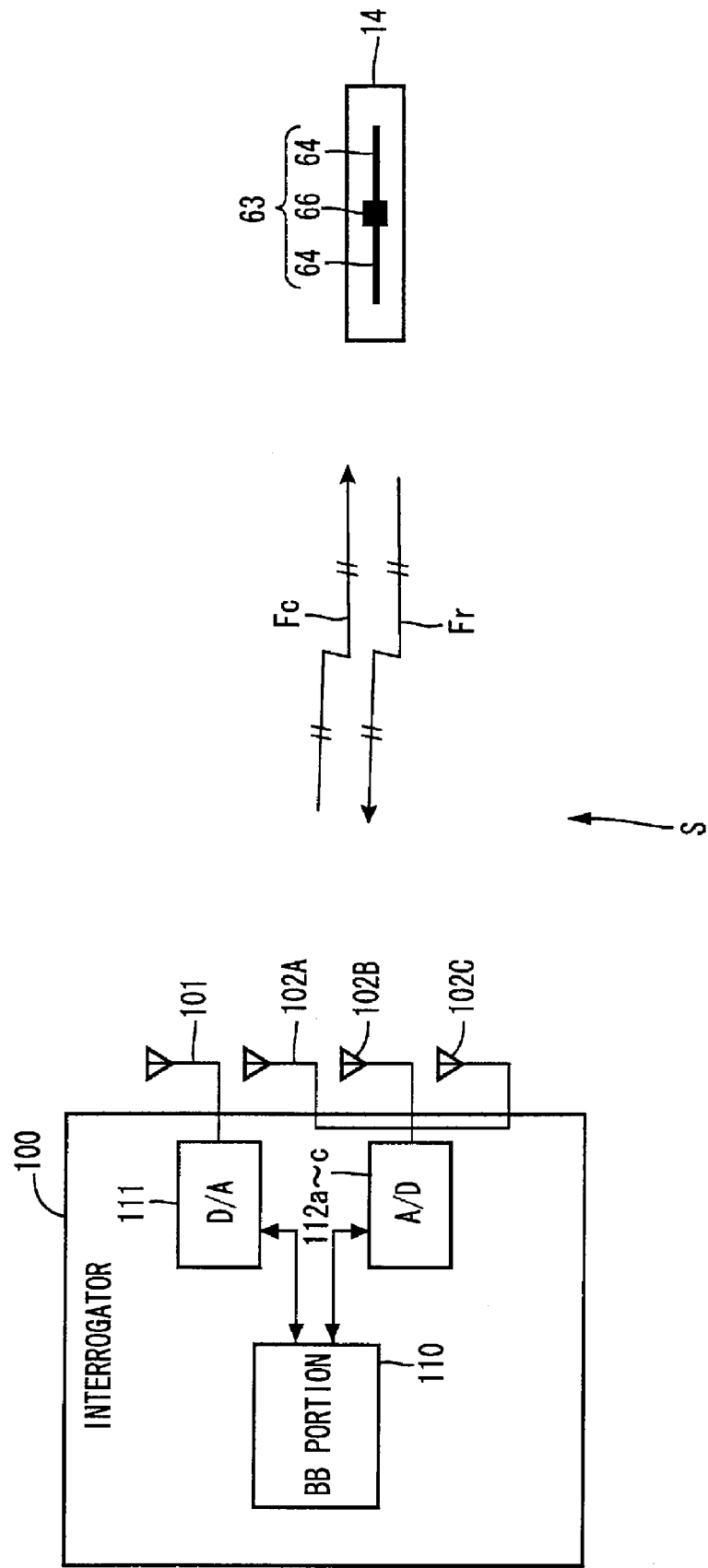
FIG. 15 is a view schematically showing an overall arrangement of a radio-frequency tag communication system including a radio-frequency communication device provided with a radio-frequency receiver device constructed according to a fifth embodiment of the present invention.

Referring to FIG. 15, there is schematically shown an arrangement of a radio-frequency communication system S, which is an RFID (radio-frequency identification) system including a radio-frequency receiver device in the form of an interrogator 100 constructed according to a fifth embodiment of the present invention, and the communication object in the form of the radio-frequency tag 14 described above. The radio-frequency communication system S may include a plurality of interrogators 100 and a plurality of radio-frequency tags 14.

The interrogator 100 has directivity of transmission and reception in a predetermined plane, which directivity is variable for signal transmission and reception with maximum electric power, to and from the antenna portion 64 of the circuit element 63 of the radio-frequency tag 14 described above by reference to FIG. 3. The interrogator 100 includes: one transmitter antenna element 101 serving as a transmitter antenna device; a plurality of receiver antenna elements 102 (three receiver antenna elements 102A, 102B and 102C in this embodiment) serving as a receiver antenna device; a BB (base band) portion 110 configured to obtain an access to the IC-circuit portion 66 of the circuit element 63 of the radio-frequency tag 14 through the transmitter and receiver antenna elements 101, 102A-102C, for reading and writing information from and on the IC-circuit portion 66, and to perform digital signal processing operations for outputting the digital transmitted signal (transmitted or interrogating wave Fc) and demodulating the reply signal (reply or reflected wave Fr) received from the radio-frequency tag 14; a transmitted-signal D/A converting portion 111 configured to convert the digital transmitted signal received from the BB 110, into an analog signal to be applied to the transmitter antenna element 101; and three received-signal A/D converting portions 112a, 112b and 112c (hereinafter collectively referred to as "received-signal A/D converting portions 112", unless otherwise specified) configured to convert the received signals received from the receiver antenna elements 102A-102C, into digital signals to be applied to the BB 110.

When the circuit element 63 of the radio-frequency tag 14 receives the transmitted wave Fc from the interrogator 100, the received transmitted wave Fc is modulated according to a predetermined information signal, into the reply wave Fr, and the reply wave Fr is received and demodulated by the interrogator 100. Thus, the radio communication is effected between the interrogator 100 and the radio-frequency tag 14.

Figure 16:
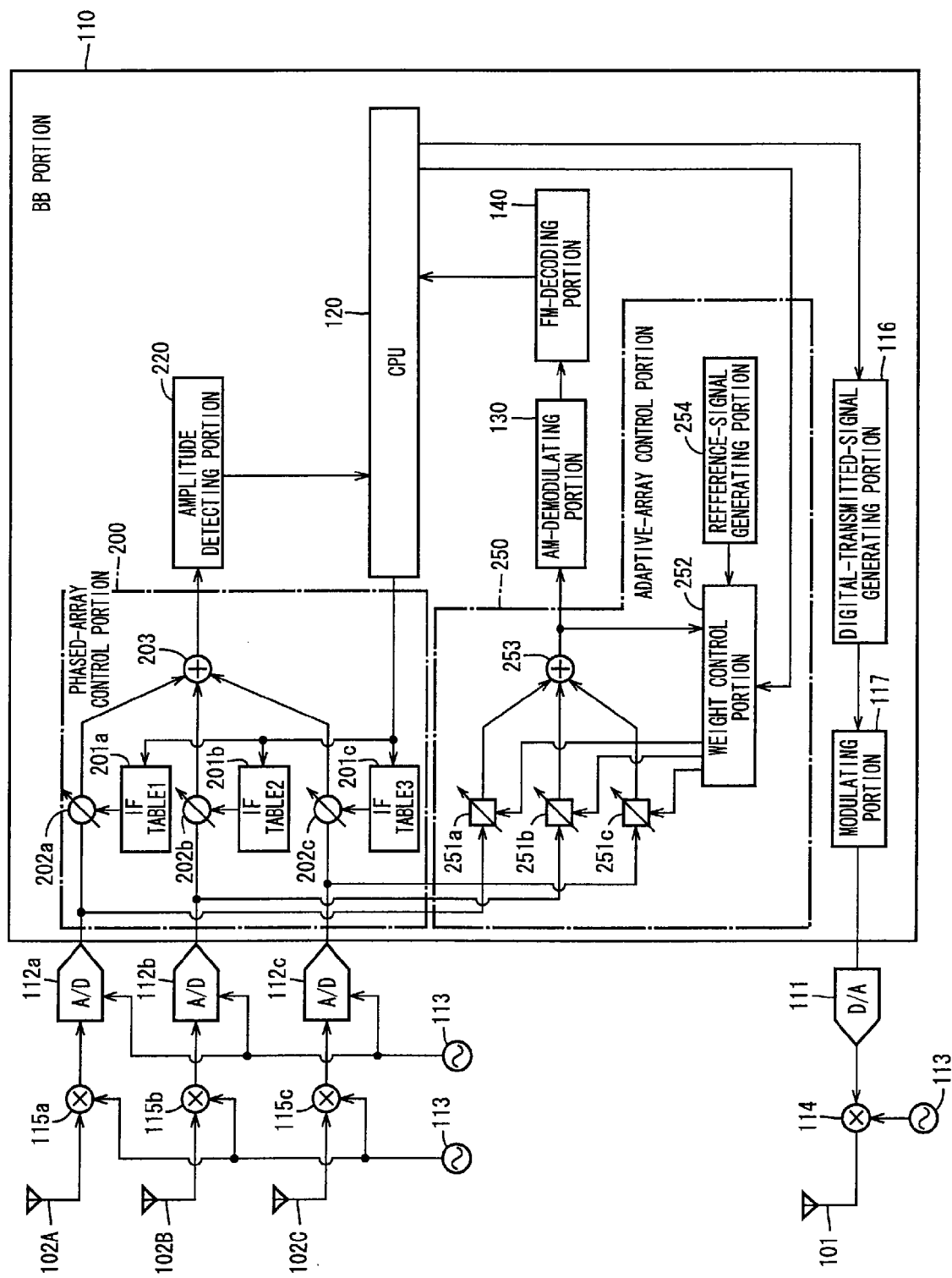
FIG. 16 is a block diagram showing a functional arrangement of an interrogator of the radio-frequency tag communication system of FIG. 15.

Referring next to the block diagram of FIG. 16, there are shown functional elements of the interrogator 100. As shown in FIG. 16, the interrogator 100 includes: the above-described transmitter and receiver antenna elements 101, 102, BB portion 110, transmitted-signal D/A converting portion 111, received-signal A/D converting portions 112; a frequency-converting-signal generating portion 113 configured to generate a frequency converting signal; an up converter 114 configured to increase the frequency of the transmitted signal which is generated by the BB portion 110 and converted into the analog signal by the received-signal D/A converting portion 111, by an amount corresponding to the frequency of the frequency converting signal generated by the frequency-converting-signal generating portion 113, and to apply the analog transmitted signal whose frequency has been increased, to the transmitter antenna element 101; and down converters 115a, 115*b*, 115*c* (hereinafter collectively referred to as "down converters 115", unless otherwise specified) configured to reduce the frequencies of the received signals received by the receiver antenna elements 102, by an amount corresponding to the frequency of the frequency converting signal generated by the frequency-converting-signal generating portion 113. The interrogator 100 may further include a band pass filter device.

The BB portion 110 is a so-called microcomputer system which incorporates a CPU 120, a ROM (not shown), a RAM (not shown) and which operates to perform signal processing operations according to control programs stored in the ROM while utilizing a temporary data storage function of the RAM. The BB portion 110 includes: the above-indicated CPU 120; a digital-transmitted-signal generating portion 116 configured to generate the digital transmitted signal to be transmitted to the circuit element 63 of the radio-frequency tag 14, according to a control signal received from the CPU 120; a modulating portion 117 configured to modulate the digital transmitted signal received from the digital-transmitted-signal generating portion 116, according to a predetermined information signal (transmitted information), and to apply the modulated transmitted signal to the transmitted-signal D/A converting portion 111; a first control portion in the form of a phased-array control portion 200; an amplitude detecting portion 220 configured to detect an amplitude of a composite signal received from the phased-array control portion 200, and to apply the detected amplitude to the CPU 120; a second control portion in the form of an adaptive-array control portion 250; and an AM-demodulating portion 130 and an FM-decoding portion 140 which are configured to demodulate and decode a composite signal which is obtained by the adaptive-array control portion 250 by combining together the received signals received by the receiver antenna elements 102, and to apply the decoded signal to the CPU 120, so that the desired information included in the received signals (information modulated by the circuit element 63 of the radio-frequency tag 14).

The phased-array control portion 200 includes: IF tables 201*a*, 201*b*, 201*c* which are basic IF wave tables set by the CPU 120 for controlling the phases of the received signals received by the receiver antenna elements 102A, 102B, 102C, to change the directivity of reception of the received signals; phase shifters 202*a*, 202*b*, 202*c* configured to change the phases of the received signals according to values of the IF tables 201*a*, 201*b*, 201*c* which are selected on the basis of phase control signals received from the CPU 120; and an adding portion 203 configured to combine together the outputs of the phase shifters 202 for obtaining a composite signal to be applied to the amplitude detecting portion 203.

The adaptive-array control portion 250 includes: multiplying portions 251*a*, 251*b*, 251*c* which receives the received signals; a weight control portion 252 which serves as an adaptive processing portion and which determines or controls weights to be given to the respective received signals at the corresponding multiplying portions 251; an adding portion 253 configured to combine together the outputs of the multiplying portions 251 for obtaining a composite signal to be applied to the AM-demodulating portion 130; and a reference-signal generating portion 254 configured to generate a predetermined reference signal r (target output signal) to be applied to the weight control portion 252.

The weight control portion 252 is arranged to determine the weights to be given to the received signals received by the respective receiver antenna elements 102, on the basis of the composite signal generated by the adding portion 253, so as to maximize the sensitivity of reception of the received signals in the direction in which the radio-frequency tag 14 is located, that is, so as to maximize the amplitude of the component of the composite signal, which component is modulated by the circuit element 63 of the radio-frequency tag 14. The phases and amplitudes of the received signals received by the respective multiplying portions 251 are changed as the weights to be applied to the multiplying portions 251 are changed by the weight control portion 252, so as to maximize the accuracy of demodulation of the composite signal by the AM-demodulating portion 130. The weights are gradually changed such that the amplitude of the above-indicated component of the composite signal approaches the amplitude of the reference signal r, while the transmission of the transmitted signal from the transmitter antenna element 101 and the reception of the received signals by the receiver antenna elements 102 are repeated. The weights are changed until the weights have been stabilized or converged into stable values at which the amplitude of the above-indicated component coincides with that of the reference signal r. The received signals received by the multiplying portions 251 are multiplied by the weights thus determined by the weight control portion 252 are combined together by the adding portion 253 into the composite signal to be received by the AM-demodulating portion 130.

The AM-demodulating portion 130 is arranged to effect orthogonal IQ demodulation, namely, to convert the composite signal Y received from the adding portion 253, into a composite I-phase (in-phase) signal Yi and a composite Q-phase (quadrature-phase) signal Yq, and to combine together into the demodulated signal. The composite I-phase signal Yi and the composite Q-phase signal Yq have a phase difference of 90°.

In the interrogator 100 constructed as described above, the digital transmitted signal is generated by the digital-transmitted-signal generating portion 116, and is modulated by the modulating portion 117 according to the predetermined transmitted information. The modulated transmitted signal is converted into the transmitted-signal converting D/A converting portion 111 into the analog signal. The analog transmitted signal, the frequency of which is increased by the up converter 114 by the amount equal to the frequency of the frequency converting signal generated by the frequency-converting-signal generating portion 113, is transmitted as the transmitted wave Fc from the transmitter antenna element 101 toward the circuit element 63 of the radio-frequency tag 14.

When the transmitted wave Fc transmitted from the transmitter antenna element 101 of the interrogator 100 is received by the antenna portion 64 of the circuit element 63 of the radio-frequency tag 14, the transmitted wave Fc is demodulated by the modulating/demodulating portion 76. At the same time, a portion of the transmitted wave Fc is rectified by the rectifying portion 68, and is stored as an electric energy in the power source portion 70. The electric energy stored in the power source portion 70 is used by the control portion 78 to generate the reply signal according to the information signal stored in the memory portion 74, and the transmitted wave Fc is modulated by the modulating/demodulating portion 78, according to the generated reply signal, to generate the reply or reflected wave Fr which is transmitted from the antenna portion 64 toward the interrogator 100.

When the reply wave Fr transmitted from the antenna portion 64 of the circuit element 63 is received by the receiver antenna elements 102 of the interrogator 100, the received reply waves Fr (received signals) are applied to the down converters 115, so that the frequencies of the received signals are reduced by the amount equal to the frequency of the frequency converting signal generated by the frequency-converting-signal generating portion 113. The received signals the frequencies of which have been reduced by the down converters 115 are converted into the digital signals by the received-signal A/D converting portions 112.

The digital received signals are applied to both the phased-array control portion 200 and the adaptive-array control portion 250, and are processed by operations of these two control portions 200, 250 that are performed in parallel with each other (more precisely, selectively in a cooperative relation with each other, as descried below). The phased-array control portion 200 is arranged to perform a phased array antenna control of the received signals, for gradually changing the directivity of reception of the received signals by the receiver antenna elements 102. The composite signal obtained by combining together the received signals subjected to the phased array antenna control is applied to the amplitude detecting portion 220, so that the amplitude of the composite signal is detected, and the detected amplitude is applied to the CPU 120. The phased-array control portion 250 is arranged to perform an adaptive array antenna control of the received signals, for changing the directivity of reception of the received signals by the receiver antenna elements 102, so as to maximize the sensitivity of reception of the received signals from the radio-frequency tag 14. The composite signal obtained by combining together the received signals subjected to the adaptive array antenna control is demodulated by the AM-modulating portion 130 into the AM-demodulated signal, which is decoded by the FM-decoding portion 140 into the decoded signal, which is applied to the CPU 120.

Figure 17:
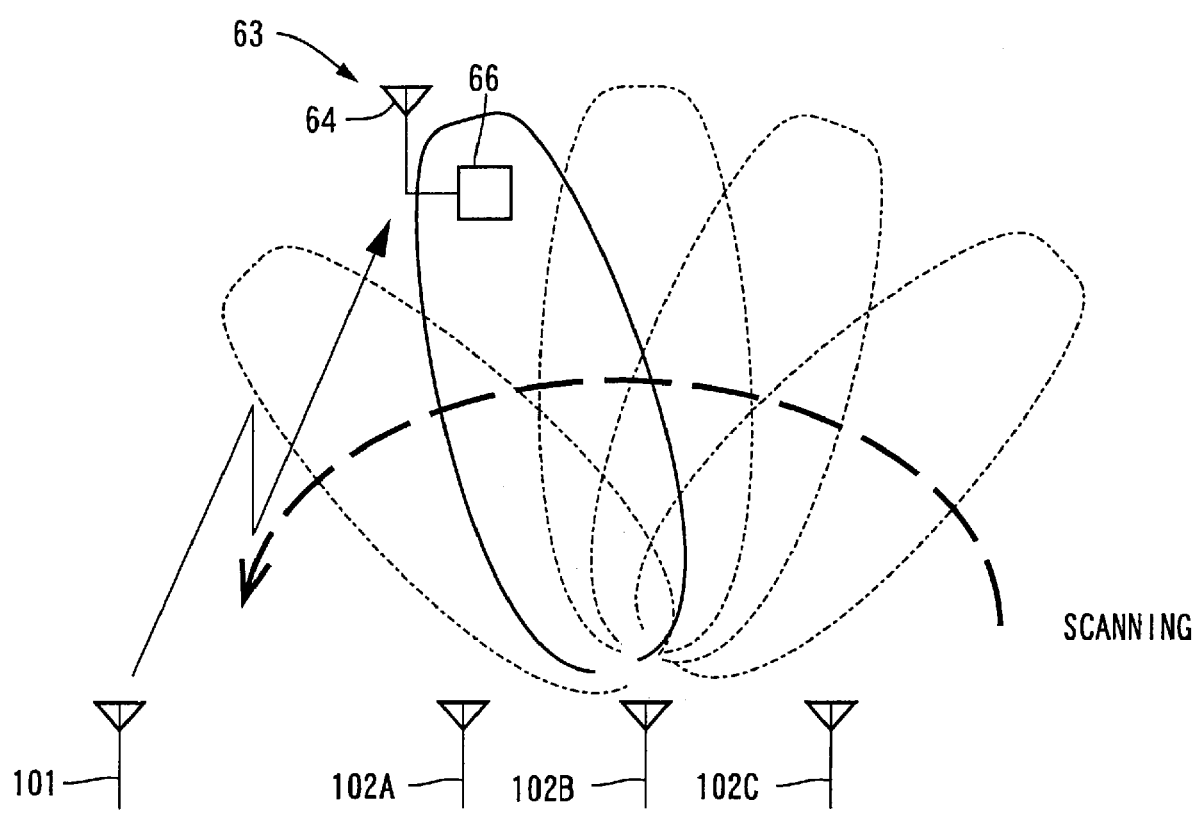
FIG. 17 is a view for explaining a behavior of a phased array antenna control.

The above-described phased array antenna control and adaptive array antenna control of the received signals are performed in parallel with each other (selectively in the operative relation with each other), such that the phased array antenna control is effected by scanning to gradually change the directivity of reception of the received signals by the receiver antenna elements 102, as indicated in FIG. 17, and the adaptive array antenna control of the received signals is effected to change the directivity of reception of the received signals by the receiver antenna elements 102, so as to maximize the sensitivity of reception of the received signals from the circuit element 63 of the radio-frequency tag 14. In this respect, it is noted in particular that the weights used for the adaptive array antenna control are determined on the basis of a result of the phased array antenna control (on the basis of the detected direction in which the radio-frequency tag 14 is located), so that the received signals are multiplied by the thus determined weights, to obtain the composite signal which is the output of the adaptive-array control portion 250.

Figure 18:
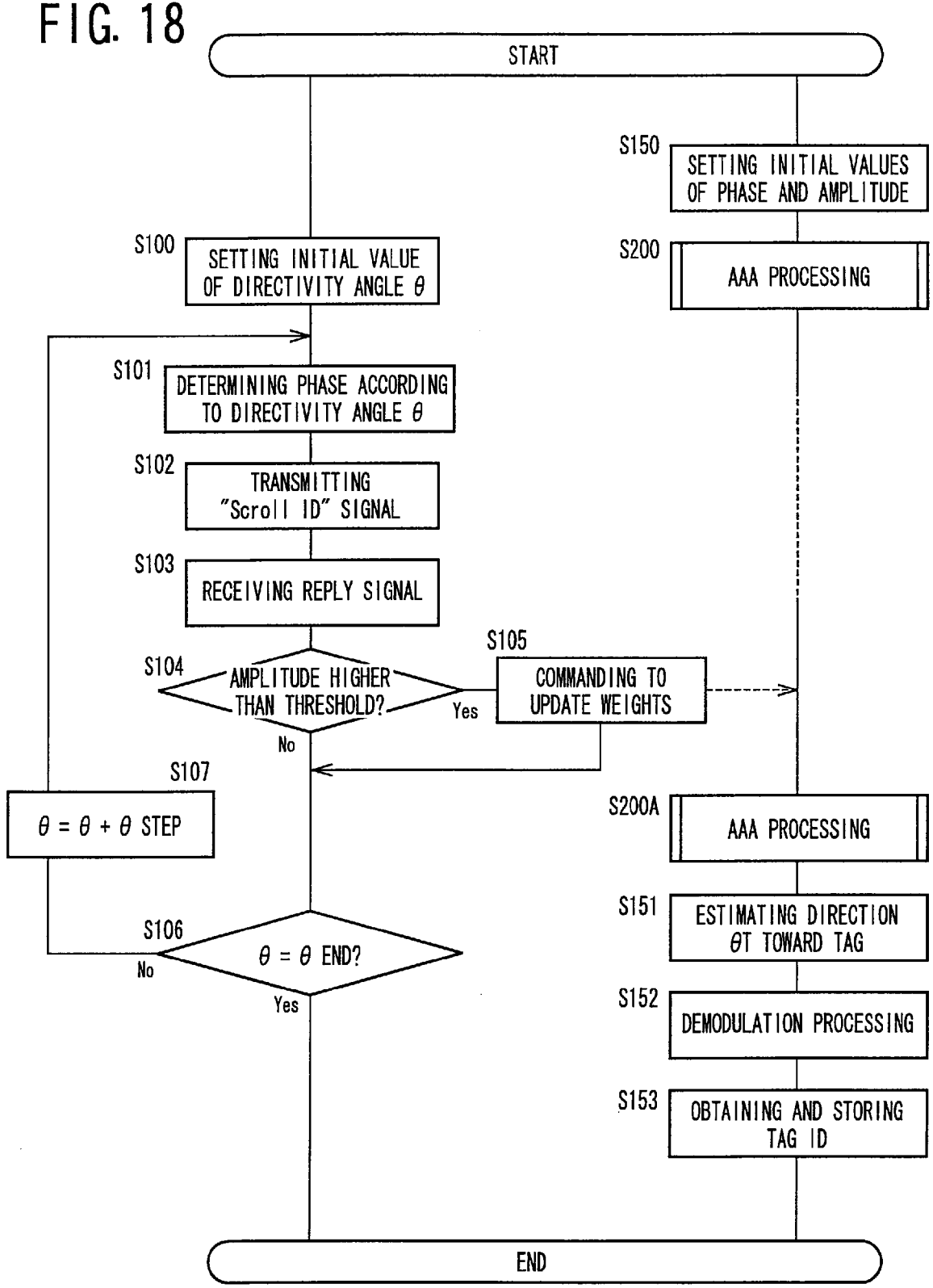
FIG. 18 is a flow chart illustrating a control routine executed by a BB portion of the interrogator of FIG. 16 for processing received signals from the radio-frequency tag.

The flow chart of FIG. 18 illustrates a control routine executed by the BB portion 110 of the interrogator for processing received signals from the circuit element 63 of the radio-frequency tag 14. A row of steps on the right side of the flow chart is executed by the adaptive-array control portion 250, while a row of steps on the left side is executed by the phased-array control portion 200.

The control routine of FIG. 18 includes step S150 in which the weight control portion 252 of the adaptive-array control portion 250 sets initial values of the phases and amplitudes of the received signals at the multiplying portions 251a, 251b, 251c, on the basis of a control command received from the CPU 120.

Step S150 is followed by step S200 in which the adaptive array antenna control (AAA processing) is performed by the adaptive-array control portion 250 under the control of the CPU 120, as described below in detail by reference to the flow chart of FIG. 19, such that the weights determined by the weight control portion 252 are gradually changed so as to maximize the strength of the received signal received by each of the receiver antenna elements 102, that is, so as to maximize the sensitivity of reception of the received signal.

Upon initiation of the adaptive array antenna control by the adaptive-array control portion 250, step S100 is implemented for the CPU 120 to set an initial value of an angle θ of the directivity (hereinafter referred to as "directivity angle θ) of reception of the receiver antennas 102 with respect to a reference position, which directivity angle θ is used by the phased-array control portion 200 to change the directivity of reception, as described below in detail.

Step S100 is followed by step S101 in which the phases corresponding to the receiver antenna elements 102 are determined on the basis of the directivity angle θ and according to the IF tables 201 of the phased-array control portion 250, and the phase control signals indicative of the phases are applied to the phase shifters 202. Described in detail, a phase difference of the received signals received by the adjacent receiver antenna elements 102 is represented by $(2 \cdot \pi \cdot d \cdot \cos\theta)/\lambda$, where "d" represents a distance between the adjacent receiver antenna elements 102, and "λ" represents the wavelength of the received waves, while "θ" represents the directivity angle. The phases corresponding to the receiver antenna elements 102 are determined according to the IF tables 201, so as to establish the phase difference $(2 \cdot \pi \cdot d \cdot \cos\theta)/\lambda$.

Step S101 is followed by step S102 to transmit a "Scroll ID" signal calling the desired radio-frequency tag 14, from the transmitter antenna element 101, under the condition of the phases determined for the receiver antenna elements 102 on the basis of the directivity angle θ as described above. Described in detail, the digital transmitted signal is generated by the digital-transmitted-signal generating portion 116 according to a control signal received from the CPU 120, and the generated digital transmitted signal is amplitude-modulated by the modulating portion 117 to obtain the "Scroll ID" signal, which is converted by the D/A converting portion 111 into the analog signal. The analog signal the frequency of which is increased by the up converter 114 is transmitted from the transmitter antenna element 101, to request the circuit element 63 of the desired radio-frequency tag 14 to respond to the "Scroll ID" signal.

Then, the control flow goes to step S103 in which the reply signal (including information identifying the desired radio-frequency tag 14) transmitted from the circuit element 63 in response to the "Scroll ID" signal is received by each of the receiver antenna elements 102, and is applied to the corresponding phase shifter 202 of the phased-array control portion 200, whereby the phases of the reply signals (received signals) are controlled by the phase shifters 202. The outputs of the phase shifters 202 are combined together by the adding portion 203 into the composite signal, the amplitude of which is detected by the amplitude detecting portion 220 and applied to the CPU 120.

Step S103 is followed by step S104 to determine whether the detected amplitude of the composite signal is higher than a predetermined threshold, that is, whether the directivity angle θ of the receiver antenna elements 102 has been changed close to a value corresponding to the direction in which the desired radio-frequency tag 14 is located. If an affirmative determination is obtained in step S104, the control flow goes to step S105.

Namely, the step S105 is implemented when the directivity angle θ of the receiver antenna elements 101 has approached a value corresponding to the direction toward the desired radio-frequency tag 14. In this step S105, the CPU 120 commands the weight control portion 252 of the adaptive-array control portion 250 to update the weights to values corresponding to the directivity angle θ. Then, the control flow goes to step S106. If a negative determination is obtained in step S104, the control flow goes directly to step S106.

In step S106, a determination is made as to whether the directivity angle θ has been gradually changed to a predetermined final value θ END (e.g., 180°). When step S106 is implemented for the first time, the directivity angle θ is smaller than the final value θ END, a negative determination is obtained in step S106, and the control flow goes to step S107 to increment the directivity angle θ by a predetermined incremental angle θ STEP (e.g., 30°). The control flow then goes back to step S101 and the subsequent steps.

Steps S101 through S107 are repeatedly implemented with the directivity angle θ being incremented in step S106, to gradually change the directivity of reception of the received signals by the receiver antenna elements 102, while the transmission of the transmitted signal and the reception of the reply signal are repeated. When the amplitude detected by the amplitude detecting portion 220 exceeds the predetermined threshold, that is, when the directivity angle θ has approached the value corresponding to the direction in which the radio-frequency tag 14 is located, the weight control portion 252 of the adaptive-array control portion 250 is commanded in step S105 to update the weights. When the directivity angle θ has been increased to the final value θ END, that is, when the affirmative determination is obtained in step S106, the phased array antenna control (PAA control) by the phased-array control portion 200 is terminated.

During the phased array antenna control by the phased-array control portion 200, the weights are updated in step S200A each time the weight control portion 252 is commanded in step S105 to update the weights after initiation of the adaptive array antenna control in step S200. When the weights have been converged, the adaptive array antenna control in step S200A is terminated, and the control flow goes to step S151.

In step S151, a direction θT in which the radio-frequency tag 14 is located is estimated on the basis of the weights at the time of the convergence. Where there exists a source of an interfering wave in the direction in which the radio-frequency tag 14 is located, the adjusted directivity of reception of the receiver antenna elements 102 may deviate from the actual direction in which the radio-frequency tag 14 is located. In this sense, the direction θT obtained in step S151 is an estimated direction in which the radio-frequency tag 14 is supposed to be located. As described above, the directivity of reception of the receiver antenna elements 102 is changed so as to maximize the sensitivity of reception of the received signals from the circuit element 63 of the radio-frequency tag 14. The adaptive array antenna control is performed to maximize the accuracy of demodulation by the AM-demodulating portion 130, for thereby maximizing the sensitivity of detection of the desired radio-frequency tag 14. Step S151 is followed by step S152 in which the composite signal obtained by combining together the received signals subjected to the adaptive array antenna control is demodulated by the AM-demodulating portion 130 into the demodulated signal, which is then decoded by the FM-decoding portion 140 into the decoded signal, which includes the information relating to the desired radio-frequency tag 14 (for example, the information identifying the tag 14). In step S153, the decoded signal is fed to the CPU 120 and stored in a suitable memory. Thus, the adaptive array antenna control by the adaptive-array control portion 250 is terminated.

Figure 19:
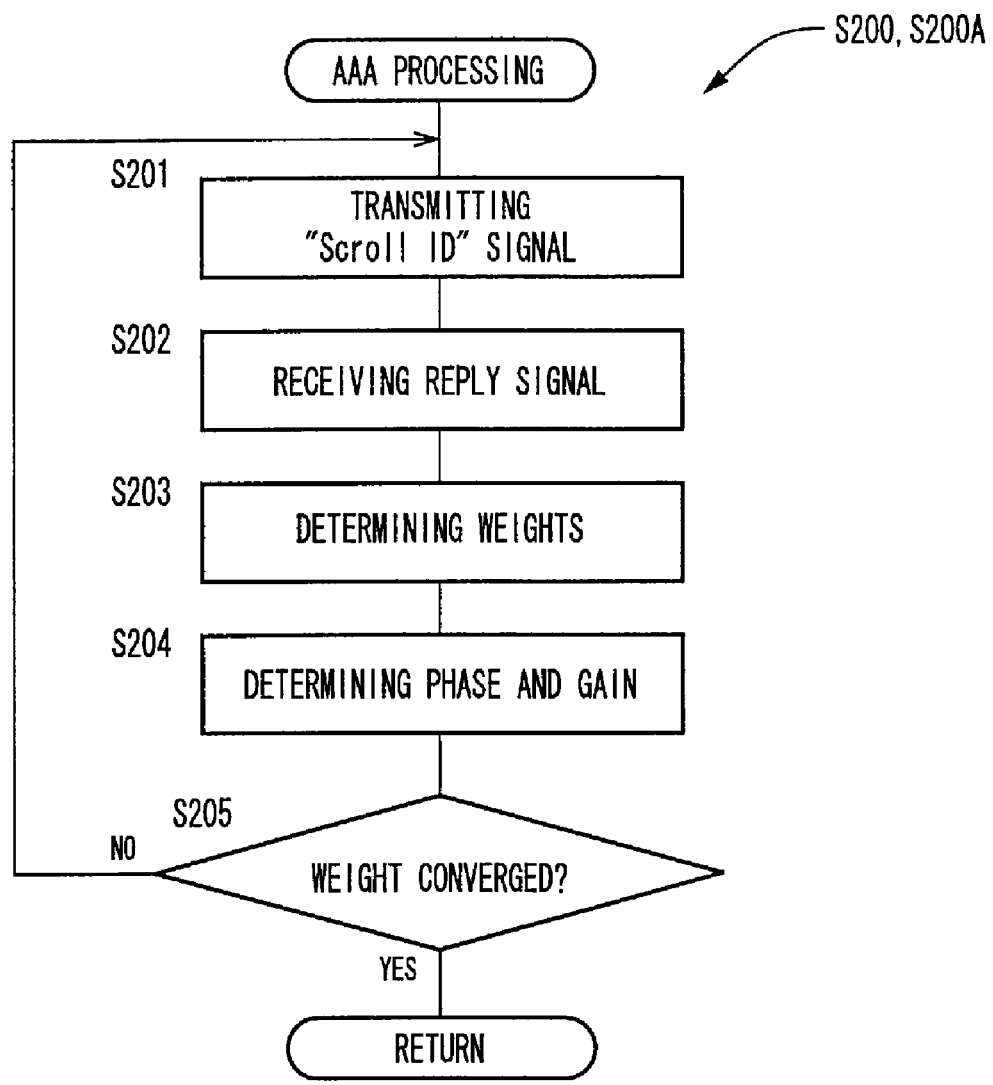
FIG. 19 is a flow chart an AAA control in step S200 of the control routine of FIG. 18, which is implemented by an adaptive array control portion of the BB portion of FIG. 16.

The flow chart of FIG. 19 illustrates the adaptive array antenna control routine executed by the adaptive-array control portion 250.

The adaptive array antenna control routine is initiated with steps S201 and S202 identical with steps S101 and S102 of FIG. 18, to transmit the "Scroll ID" signal from the transmitter antenna element 101, and to receive the reply signal transmitted from the circuit element 63 of the desired radio-frequency tag 14, through the receiver antenna elements 102. The received signals received by the receiver antenna elements 102 are applied through the multiplying portions 251 to the adding portion 253, and are combined together into the composite signal, which is applied to the weight control portion 252 as well as to the AM-demodulating portion 130.

In the following step S203, the weight control portion 252 determines the weights corresponding to the receiver antenna elements 102, on the basis of the strength of the composite signal received from the adding portion 253. Step S203 is followed by step S204 to set the phases and amplitudes (gains) corresponding to the determined weights, and to apply the corresponding phase control signals to the multiplying portions 251.

The weights determined in step S203 are stored in a suitable memory provided in the weight control portion 252 (or in the CPU 120). Step S204 is followed by step S205 in which the newly determined and weights are compared with the last determined and stored weights, to determine whether an amount of change of each of the newly determined weights with respect to the corresponding last determined weight is smaller than a predetermined threshold. If the amount of change is smaller than the threshold, it is determined that the weight has been converged. Steps S201 through S205 are repeatedly implemented until the amount of change has become smaller than the threshold, that is, until an affirmative determination is obtained in step S205. Thus, the directivity of reception of the receiver antenna elements 102 is adjusted by updating the weights until the strength of the received signals is maximized, namely, until the sensitivity of reception of the received signals by the receiver antenna elements 102 is maximized. In the presence of an interfering signal included in the received signals, the directivity is adjusted so as to minimize the interfering signal.

The affirmative determination is eventually obtained in step S205 as a result of repeated implementation of steps S201, S202, S203, S204 and S205. The affirmative determination means that the sensitivity of reception of the received signals by the receiver antenna elements 102 has been maximized.

It will be understood from the foregoing description of the fifth embodiment of this invention that the BB portion 110 including the phased-array control portion 200, adaptive-array control portion 250, CPU 120, etc. constitutes a directivity control portion configured to control the directivity of the plurality of receiver antenna elements 102, by selectively enabling the first control portion in the form of the phased-array control portion 200 and the second control portion in the form of the adaptive-array control portion 250. It will also be understood that the weight control portion 252 of the adaptive-array control portion 250 constitutes a weight determining portion configured to determine the weights to be given to the respective received signals, on the basis of a result of the first control by the first control portion, such that the composite signal obtained by combining together the received signals multiplied by the determined weights approaches the reference signal, while the multiplying portions 251, adding portion 253 and a filtering portion (not shown) cooperate to constitute a composite-signal generating portion configured to generate the composite signal by multiplying the received signals by the weights determined by the weight determining portion.

It will further be understood that the CPU 120 constitutes an arithmetic portion, and the IF tables 201 constitute a first weight determining portion configured to determine first weights for the first control portion, on the basis of the phase control signal received from the arithmetic portion, while the phase shifters 202 and the adding portion 204 cooperate to constitute a first composite-signal generating portion configured to generate a first composite signal for the first control portion, on the basis of the first weights determined by the first weight determining portion. It will also be understood that the weight control portion 252 constitutes a second weight determining portion configured to determined second weights for the second control portion, on the basis of the phase/amplitude control signals received from the arithmetic portion, and the multiplying portions 251 and the adding portion 253 cooperate to constitute a second composite-signal generating portion configured to generate a second composite signal for the second control portion, on the basis of the second weights determined by the second weight determining portion.

It will also be understood that the AM-demodulating portion 130 constitutes a demodulating portion configured to demodulate the composite signal generated by the composite-signal generating portion or a signal based on the composite signal.

In the radio-frequency receiver device in the form of the interrogator 100 constructed according to the fifth embodiment of this invention, a first control in the form of the phased array antenna control of the directivity of reception of the receiver antenna elements 102 by the phased-array control portion 200, and a second control in the form of the adaptive array antenna control of the directivity of reception of the receiver antenna elements 103 by the adaptive-array control portion 250 are performed in parallel with each other and selectively in a cooperative relation with each other, in the BB portion 110 according to the control signals from the CPU 120, as described above by reference to the flow chart of FIG. 18, such that the phased array antenna control is performed to gradually change the directivity of reception, and the adaptive array antenna control is performed so that the received signals received by the receiver antenna elements 102 from the radio-frequency tag 14 approach the reference signal, whereby the sensitivity of reception of the received signals by the receiver antenna elements 102 is maximized.

Thus, the interrogator 100 is capable of not only determining the direction of reception of the received signals by the phased array antenna control, but also improving the sensitivity of reception of the received signals by the adaptive array antenna control, in a comparatively short time. In this respect, it is noted in particular that the adaptive array antenna control by the adaptive-array control portion 250 to maximize the sensitivity of reception of the received signals is performed on the basis of a result of the phased array antenna control by the phased-array control portion 200 to control the directivity of reception. Namely, the adaptive array antenna control is effected to maximize the sensitivity of reception of the received signals in the direction of the radio-frequency tag 14 which has been detected by the phased array antenna control. Described in detail, the weights to be given to the received signals are determined by the weight control portion 252 on the basis of a result of the phased array antenna control by the phased-array control portion 200, that is, on the basis of the detected direction in which the radio-frequency tag 14 is located. The received signals multiplied by the determined weights by the multiplying portions 251 are combined together into the composite signal, which reflects the phased array antenna control. Accordingly, the combination of the phased array antenna control and the adaptive array antenna control according to the present fifth embodiment permits a high degree of sensitivity of reception of the received signals to be established in a shorter time, than the adaptive array antenna control only.

In the present embodiment, the phased array antenna control and the adaptive array antenna control are performed in parallel with each other, or substantially concurrently, as shown in the flow chart of FIG. 18. Usually, calculation to update the weights used in the adaptive array antenna control must be performed several tens of thousands times until the weights have been converged, depending upon the presence of an interfering wave and the degree of modulation of the reply wave transmitted from the radio-frequency tag 14. In view of this, the present embodiment is arranged such that the adaptive array antenna control is performed during a period of time in which the phased array antenna control is performed to increment the directivity angle θ for detecting the direction in which the reply wave is received from the radio-frequency tag 14, as shown in the flow chart of FIG. 18. Accordingly, the adaptive array antenna control can be completed within the period of time required to perform the phased array antenna control, so that the sensitivity of reception of the received signals by the receiver antenna from the radio-frequency tag 14 can be effectively shortened.

The fifth embodiment of FIGS. 15-19 described above may be modified as needed. Some modifications of the fifth embodiment will be described.

Figure 20:
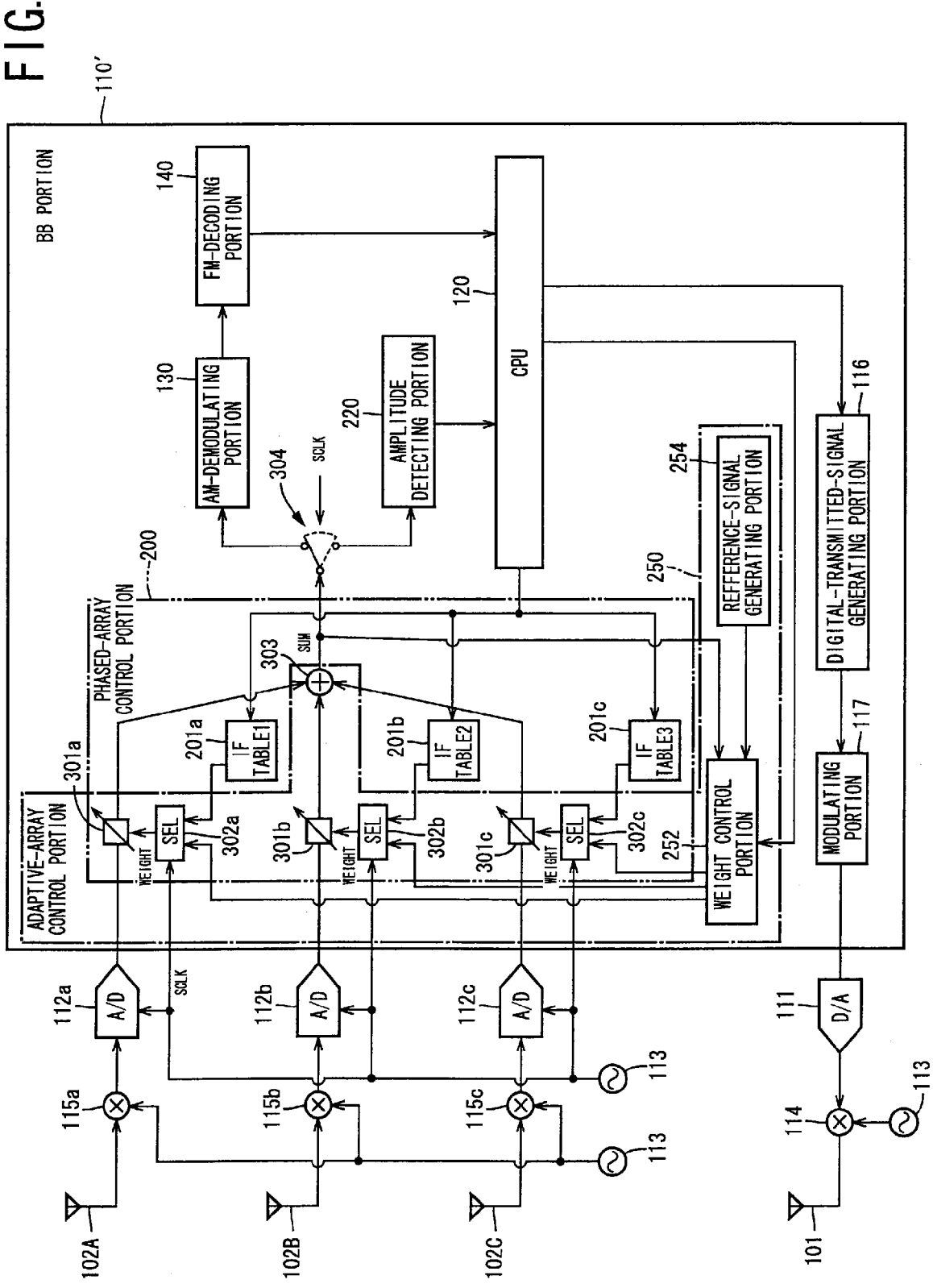
FIG. 20 is a block diagram showing a functional arrangement of a BB portion of a modified interrogator wherein a phased array control portion and an adaptive array control portion of the BB portion commonly use some elements.

(1) Modifications in which the Phased-Array Control Portion and the Adaptive-Array Control Portion Use Common Elements Although the phased-array control portion 200 and the adaptive-array control portion 250 are provided separately from each other in the fifth embodiment, some circuit elements may be commonly used by these two control portions 200, 250. The block diagram of FIG. 20 shows an arrangement of a BB portion 110' of the interrogator according to such a modification as a first modification of the fifth embodiment. The same reference signs as used in FIG. 16 will be used in FIG. 20 to identify the same elements, which will not be described.

In the BB portion 110', the phased-array control portion 200 and the adaptive-array control portion 250 can control the phases and amplitudes of the received signals received by the receiver antenna elements 102. These phased-array and adaptive-array control portions 200, 250 commonly use: multiplying portions 301a, 201b, 301c which have the function of the phase shifters 202 and the function of the multiplying portions 251 provided in the fifth embodiment of FIG. 16: selectors 302a, 302b, 302c configured to perform a switching operation for selecting one of the above-described two functions of the multiplying portions 301 in each of predetermined short time divisions (as described below by reference to FIG. 21), in synchronization with the frequency converting signal (clock signal SCLK) received from the frequency-converting-signal generating portion 113; and an adding portion 303 configured to combine together the outputs of the multiplying portions 301. The output of the adding portion 303 is applied to a selector switch 304, which performs a switching operation for applying the output of the adding portion 303 selectively to the AM-demodulating portion 130 or the amplitude detecting portion 220, in each of the short time divisions, in synchronization with the frequency converting signal (clock signal SCLK) received from the frequency-converting-signal generating portion 113.

Figure 21:
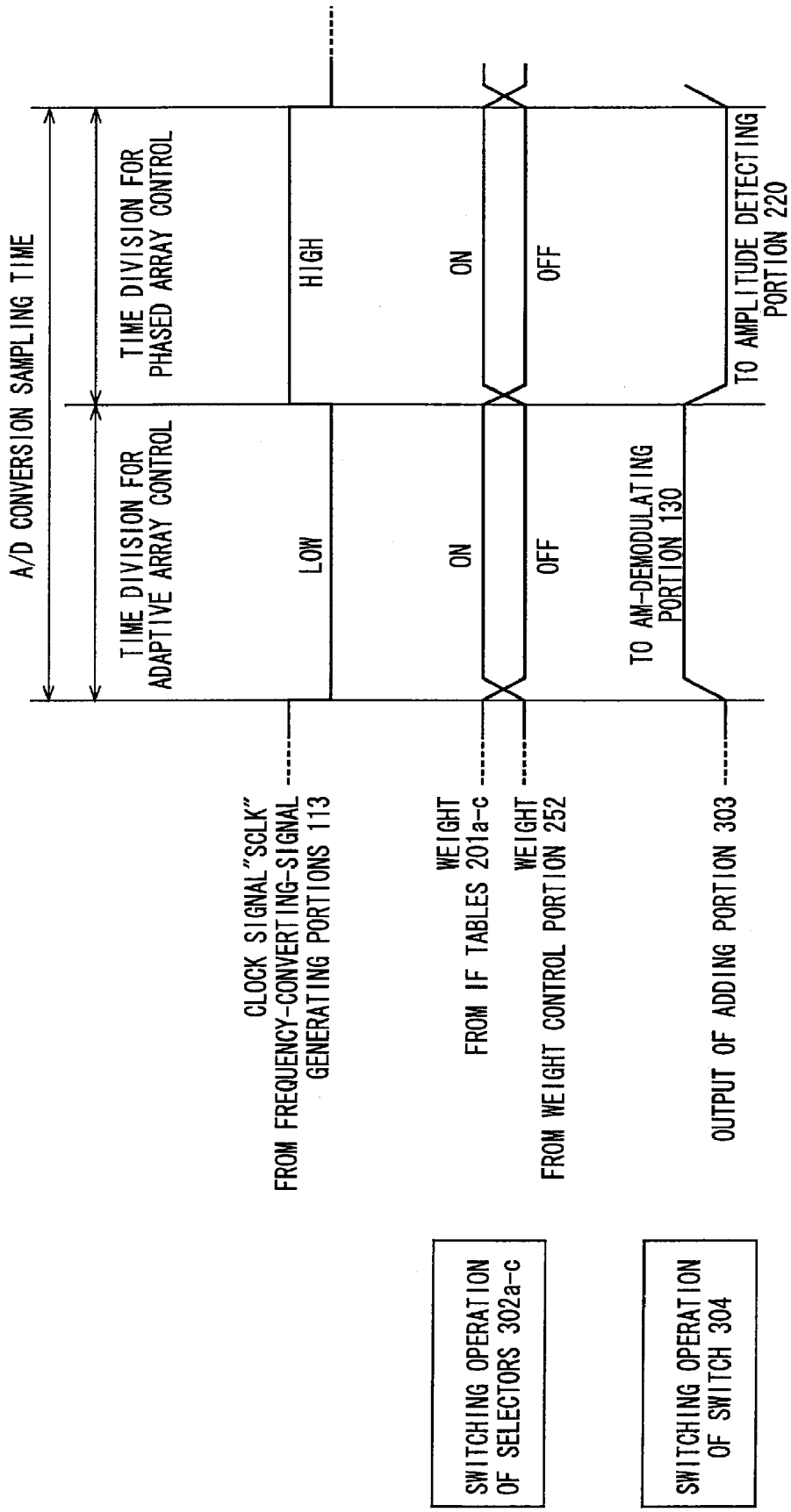
FIG. 21 is a time chart indicating switching operations performed by selectors and a selector switch shown in FIG. 20.

The time chart of FIG. 21 indicates the switching operations performed by the selectors 302 and the selector switch 304. In the example of FIG. 21, a sampling time of the received-signal A/D converting portions 112 which is defined by the frequency converting signal (clock signal SCLK used for the analog-to-digital conversion of the received signals) is divided into two short time divisions one of which is used for the adaptive array antenna control and the other of which is used for the phased array antenna control, so that the phased array antenna control and the adaptive array antenna control are performed in a time-sharing fashion. The time division for the phased array antenna control is referred to as a first time division, while the time division for the adaptive array antenna control is referred to as a second time division.

Described in detail, the second time division for the adaptive array antenna control is a period during which the clock signal SCLK generated by the frequency-converting-signal generating portion 113 is in the low state. During this second time division, the selectors 302 apply the weights determined by the weight control portion 252, to the multiplying portions 301, and the selector switch 304 applies the output (signal SUM) of the adding portion 303 to the AM-demodulating portion 130.

During the second time division, therefore, the multiplying portions 301 function as a part of the adaptive-array control portion 250, like the multiplying portions 251 in the fifth embodiment of FIG. 16. Namely, the weight control portion 252 update the weights to change the amplitudes and phases of the received signals received by the receiver antenna elements 102, on the basis of the composite signal obtained by the adding portion 303, so as to maximize the sensitivity of reception of the received signals by the receiver antenna elements 102 in the direction of the radio-frequency tag 14, that is, so as to maximize the amplitude of the component of the reply signal which has been modulated by the circuit element 63, so that the composite signal approaches the reference signal "r". The weights are presented by phase control signals to be applied from the weight control portion 252 to the multiplying portions 301, and are updated until the weights are converged. As a result, the received signals are subjected to the adaptive array antenna control, and are combined together by the adding portion 303 into the composite signal to be eventually applied to the AM-demodulating portion 130 through the selector switch 304.

On the other hand, the first time division for the phased array antenna control is a period during which the clock signal SCLK generated by the frequency-converting-signal generating portion 113 is in the high state. During this first time division, the selectors 302 apply the control signals generated (weights determined) by the IF tables 201, to the multiplying portions 301, and the selector switch 304 applies the output (signal SUM) of the adding portion 303 to the amplitude detecting portion 220.

During the first time division, therefore, the multiplying portions 301 function as a part of the phased-array control portion 200, like the phase shifters 202 in the fifth embodiment of FIG. 16. Namely, the values of the IF tables 201 which are selected according to the phase control signal from the CPU 120 are applied to the multiplying portions 301 to change the phases of the received signals received by the receiver antenna elements 102, for thereby gradually changing the directivity of reception of the received antenna elements 102. As a result, the received signals are subjected to the phased array antenna control, and are combined together by the adding portion 303 into the composite signal to be eventually applied to the amplitude detecting portion 220 through the selector switch 304, so that the amplitude of the composite signal is detected by the amplitude detecting portion 220, and the detected amplitude is applied to the CPU 120.

It will be understood that the multiplying portions 301 constitute a common composite-signal generating portion serving as the above-described first and second composite-signal generating portions, and the selectors 302 constitute a switching portion configured to selectively apply the weights determined by the above-described first weight determining portion or the weights determined by the above-described second weight determining portion, to the common composite-signal generating portion.

The present first modification of FIGS. 20 and 21 has substantially the same advantages as the fifth embodiment of FIGS. 15-19, and a further advantage that the common use of the multiplying portions 301 and the adding portion 303 for the phased array antenna control and the adaptive array antenna control simplifies the overall construction of the radio-frequency receiver device (interrogator 100), and accordingly reduces the cost of manufacture of the radio-frequency device.

In the modification of FIGS. 20 and 21, the two halves of the sampling time of the received-signal A/D converting portions 112 are assigned as the two time divisions for the phased and adaptive array antenna controls. However, a time proportion or ratio of the phased and adaptive array antenna controls may be variable.

Figure 22:
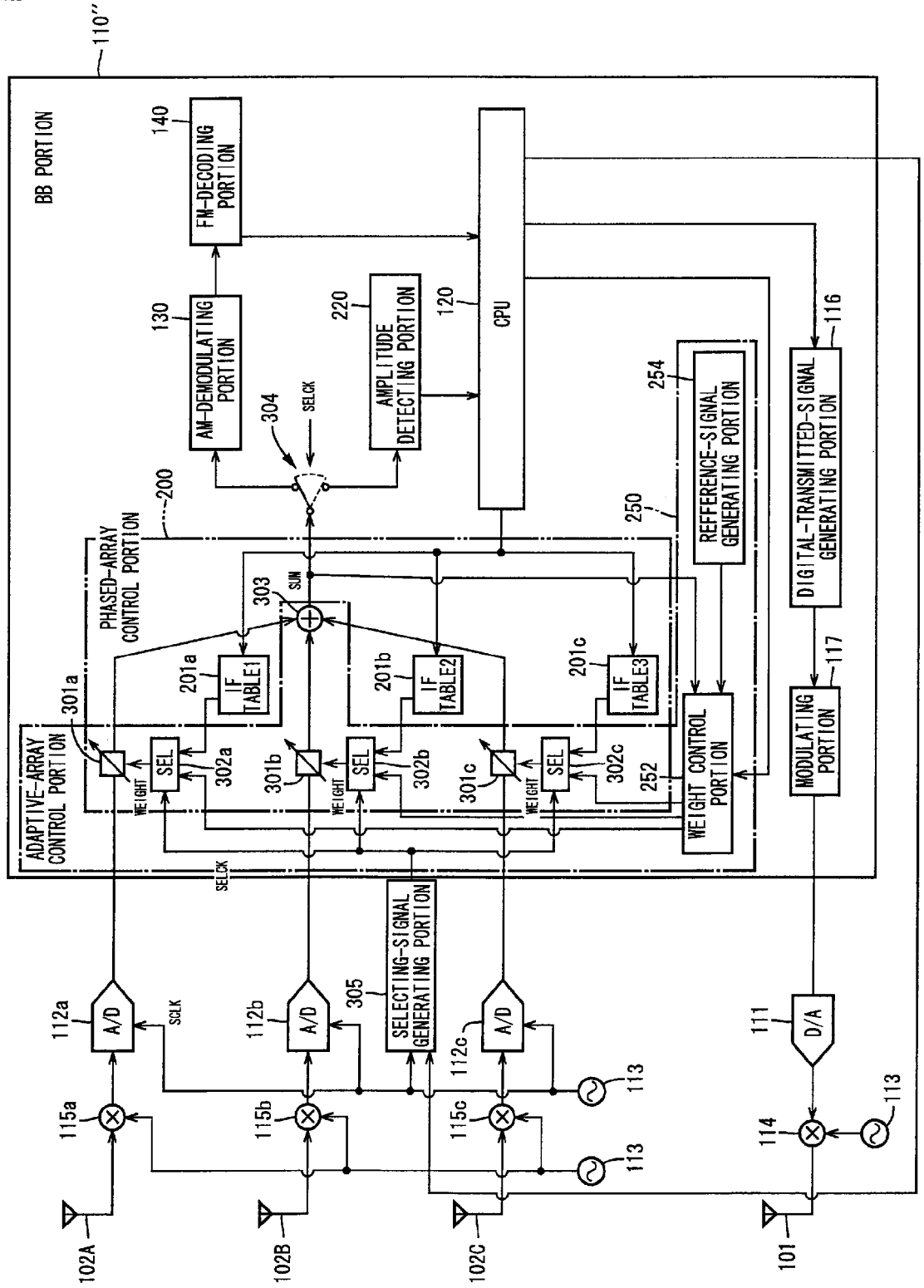
FIG. 22 is a block diagram showing a functional arrangement of a BB portion of a modified interrogator in which a proportion of the two time divisions for the phased array antenna control and the adaptive array antenna control is variable.

The block diagram of FIG. 22 shows an arrangement of a BB portion 110" of the interrogator according to such a modification as a second modification of the fifth embodiment. The same reference signs as used in FIG. 20 will be used in FIG. 22 to identify the same elements, which will not be described.

This interrogator is provided with a selecting-signal generating portion 305, which generates a selecting signal SCLK for selecting the adaptive array antenna control or the phased array antenna control, in synchronization with the frequency converting signal (clock signal SCLK) generated by the frequency-converting-signal generating portion 113. The selectors 302 and the selector switch 304 perform the switching operations according to the selecting signal SCLK received from the selecting-signal generating portion 305.

Figure 23:
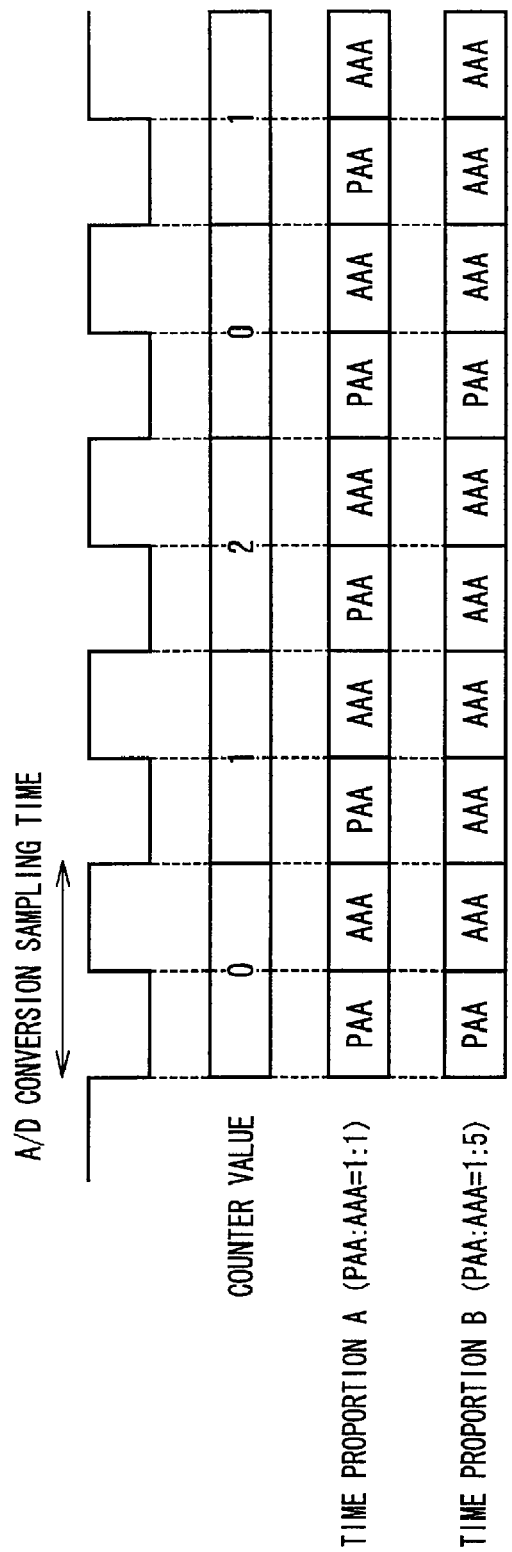
FIG. 23 is a view indicating two different time proportions or ratios of the phased and adaptive array antenna controls, which are selected according to a selecting signal generated by a selecting-signal generating portion of the modified interrogator shown in FIG. 22.

FIG. 20 indicates two different time proportions A and B of the phased array antenna control and the adaptive array antenna control, which are selected according to the selecting signal generated by the selecting-signal generating portion 305. In the example of FIG. 23, the sampling time of the received-signal A/D converting portions 112 is divided into two short time divisions, as in the case of FIG. 21. In the present second modification, however, each of these two time divisions is selected as the time division for the phased array antenna control or the adaptive array antenna control, according to the selecting signal, so that the time proportion or ratio of the phased and adaptive array antenna controls can be changed between two values.

As shown in FIG. 23, the time proportion A is equal to the time proportion indicated in FIG. 21. That is, the first half of the sampling time is used for the adaptive array antenna control. During the first half, the selectors 302 and the selector switch 304 are controlled by the selecting signal generated by the selecting-signal generating portion 305 such that the selectors 302 apply the weights of the weight control portion 252 to the multiplying portions 301, and the selector switch 304 applies the output of the adding portion 303 to the AM-demodulating portion 130. During the second half, the selectors 302 and the selector switch 304 are controlled by the selecting signal such that the selectors 302 apply the control signals of the IF tables 201 to the multiplying portions 301, and the selector switch 304 applies the output of the adding portion 303 to the amplitude detecting portion 220. According to the time proportion A, therefore, the ratio of the time durations for the phased and adaptive array antenna controls is 1:1.

According to the time proportion B, a length of time three times the sampling time of the A/D converting portions 112 is handled as one cycle of control. This length of time corresponds three sampling cycles according to the clock signal SCLK generated by the frequency-converting-signal generating portion 113. The three sampling cycles are counted by a counter and represented by counts "0", "1" and "2" indicated in FIG. 23. Each sampling cycle consists of the two halves of the sampling time described above. The first and second halves of the first sampling cycle are respectively used for the adaptive array antenna control and phase array antenna control, as in the case of the proportion A. In the second and third sampling cycles, the first and second halves are both used for the adaptive array antenna control. According to the proportion B, therefore, the ratio of the time durations for the phased and adaptive array antenna controls is 1:5. The first half of the first sampling cycle is a first time division for the phased array antenna control, while the second half of the first sapling cycle and the first and second halves of the second and third sampling cycles constitute a second time division for the adaptive array antenna control.

It will be understood that the selecting-signal generating portion 305 constitutes a switching control portion configured to control the switching portion such that the first weights determined by the first weight determining portion are applied to the common composite-signal generating portion, during a first time division, while the second weights determined by the second weight determining portion are applied to the common composite-signal generating portion, during a second time division.

In the second modification of FIGS. 22 and 23, the ratio of the time divisions for the adaptive array antenna control and the phased array antenna control can be varied according to the selecting signal generated by the selecting-signal generating portion 305. The selecting-signal generating portion can be controlled according to a control signal from the CPU 120, to change the time proportion of the adaptive and phased array antenna controls. Since the adaptive array antenna control generally requires a longer time than the phased array antenna control, it is desirable that the time division for the adaptive array antenna control is made longer than the time division for the phased array antenna control.

In the second modification, the sampling time of the received-signal A/D converting portions 112 is divided into the two equal time divisions. However, the sampling time may be divided into two time divisions the ratio of which is variable, so that the time ratio or proportion of the phased and adaptive array antenna controls is variable.

(2) Modification in which the Adaptive Array Antenna Control is Performed after Completion of the Phased Array Antenna Control In the fifth embodiment and the first and second modifications, the phased array antenna control by the phased-array control portion 200 and the adaptive array antenna control by the adaptive-array control portion 250 are performed substantially concurrently in parallel with each other, the adaptive array antenna control to improve the sensitivity of reception of the received signals may be performed after detection of the radio-frequency tag 14 by the phased array antenna control.

Figure 24:
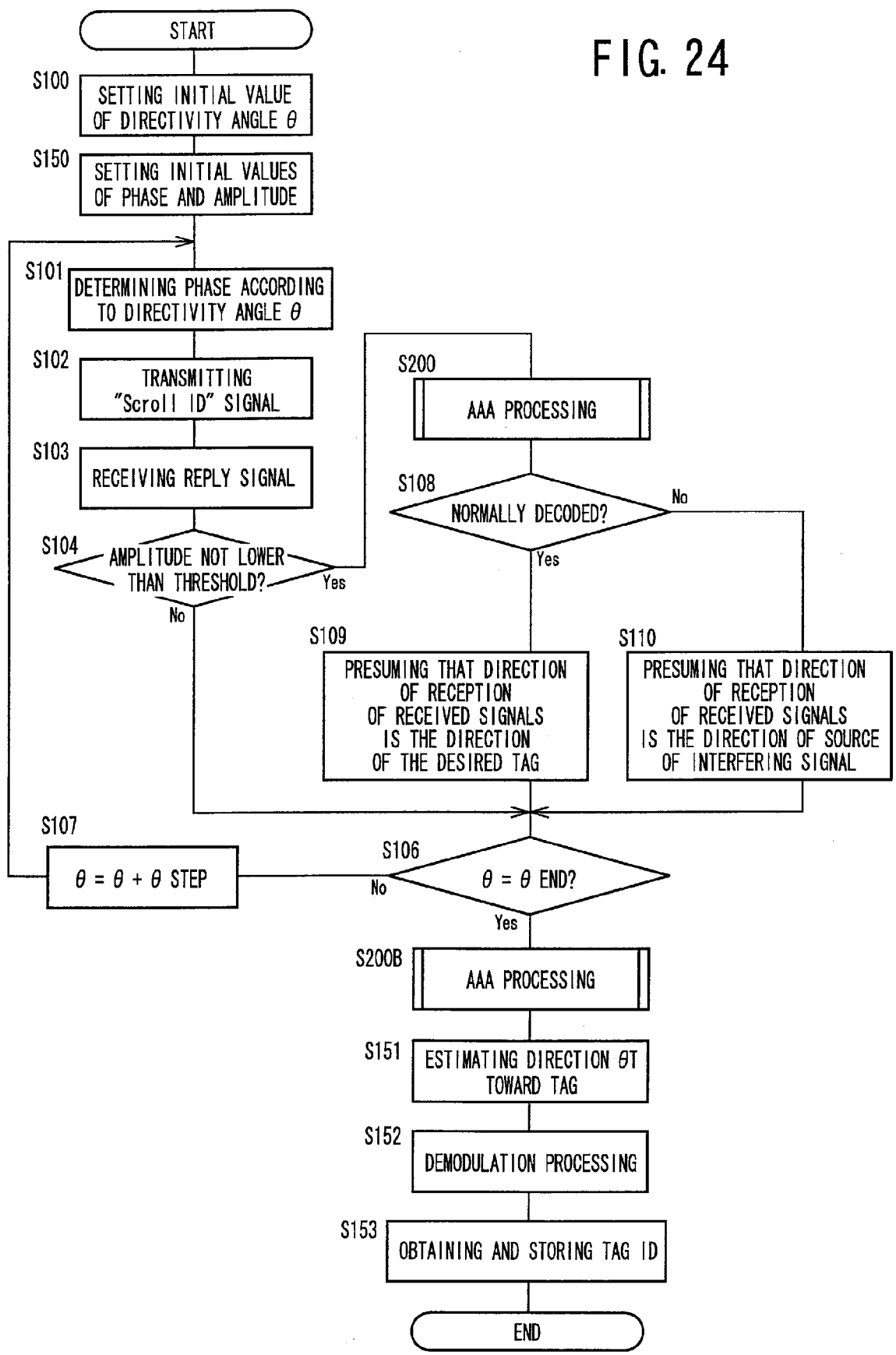
FIG. 24 is a flow chart illustrating a control routine for processing received signals, which is executed by a BB portion of a modified interrogator wherein the adaptive array antenna control is implemented after completion of the phased array antenna control.

The flow chart of FIG. 24 corresponding to that of FIG. 18 illustrates a control routine executed by the BB portion 110 of the interrogator 100 for processing the received signals, according to a third modification of the fifth embodiment. In FIG. 24, the same reference signs as used in FIG. 18 will be used to identify the same steps, which will not be described.

Like the control routine of FIG. 18, the control routine of FIG. 24 is initiated with step S100 in which the CPU 120 sets the initial value of the directivity angle θ. Then, the control flow goes to step S150 in which the weight control portions 252 of the adaptive-array control portion 250 sets the initial values of the phase and amplitude of the received signals at the multiplying portions 251a, 251b, 251c.

Then, steps S101-S104 are implemented as described above by reference to FIG. 18. Briefly, the phases corresponding to the receiver antenna elements 102 are determined on the basis of the directivity angle θ and according to the IF tables 201 of the phased-array control portion 250, and the phase control signals indicative of the phases are applied to the phase shifters 202. Then, the "Scroll ID" signal calling the desired radio-frequency tag 14 is transmitted from the transmitter antenna element 101, and the reply signal is received by each of the receiver antenna elements 102, and is applied to the corresponding phase shifter 202 of the phased-array control portion 200. The amplitude of the composite signal generated by the adding portion 203 is detected by the amplitude detecting portion 220, and the determination is made as to whether the detected amplitude of the composite signal is higher than the predetermined threshold, that is, as to whether the directivity angle θ of the receiver antenna elements 102 has been changed close to a value corresponding to the direction in which the desired radio-frequency tag 14 is located.

If the negative determination is obtained, the control flow goes to step S106. If the affirmative determination is obtained, the control flow goes to step S200 (shown in detail in FIG. 19) in which the adaptive array antenna control is performed by the adaptive-array control portion 250, as described above, so that the directivity of reception of the receiver antenna elements 102 is controlled by updating the weights determined by the weight control portion 250, so as to maximize the strength of the received signals, that is, to maximize the sensitivity of reception of the received signals. The composite signal obtained by combining together the received signals is demodulated and decoded by the AM-demodulating portion 130 and FM-decoding portion 140, and the decoded signal is applied to the CPU 120. Step S200 is followed by step S108 in which the CPU 120 determines whether the received signals have been normally decoded by the FM-decoding portion 150.

If an affirmative determination is obtained in step S108, the control flow goes to step S109 to presume that the direction in which the received signals have been received is the direction in which the desired communication object (desired ratio-frequency tag 14) is located. This direction will be referred to as a "tag point" and used in the subsequent control. For instance, a tag-point flag may be set in the on state when the affirmative determination is obtained in step S108. If a negative determination is obtained in step S108, the control flow goes to step S110 to presume that the direction in which the received signals have been received is not the direction in which the desired communication object is located, but is the direction in which a source of an interfering signal is located. The source of the interfering signal may be an object by which the reply transmitted from the radio-frequency tag 14 is reflected before the reply signal is received by the interrogator 100. This direction will be referred to as a "null point" and used in the subsequent control. For instance, a null-point flag may be set in the on state when the negative determination is obtained in step S108.

Steps S109 and S110 are followed by step S106 described above by reference to FIG. 18, to determine whether the directivity angle θ has been changed to the predetermined final value θ END. If the negative determination is obtained in step S106, the control flow goes to step S107 to increment the directivity angle θ by the predetermined incremental angle θ STEP (e.g., 30°), and then goes back to step S101 and the subsequent steps.

Steps S101 through S107 are repeatedly implemented with the directivity angle θ being incremented gradually change the directivity of reception of the received signals by the receiver antenna elements 102, while the transmission of the transmitted signal and the reception of the reply signal are repeated. While the amplitude detected by the amplitude detecting portion 220 is higher than the predetermined threshold, that is, when the directivity angle θ is close to a value corresponding to the direction in which the radio-frequency tag 14 is located, the adaptive array antenna control is performed by the adaptive-array control portion 250 in step S200, and steps S1-8-S110 are implemented to determine whether the direction of reception of the received signals is the direction of the desired radio-frequency tag 14 or the source of the interfering signal, depending upon whether the received signals have been normally decoded. When the directivity angle θ has changed to the final value θ END, that is, when the affirmative determination is obtained in step S106, the phased array antenna control is terminated, and the control flow goes to step S200B.

Like steps S200 and S200A described above by reference to FIG. 18, step S200B is implemented to perform the adaptive array antenna control, but after steps S108-S110, to control the directivity of reception of the receiver antenna elements 102, so as to maximize the strength of the received signals, that is, to maximize the sensitivity of reception of the received signals.

The adaptive array antenna control is terminated when the weights determined by the weight control portion 252 have been converged, and the control flow goes to step S151, as in the control routine of FIG. 18.

In step S151, the direction θT in which the radio-frequency tag 14 is located is estimated on the basis of the weights at the time of the convergence. Step S151 is followed by step S152 in which the composite signal generated by the adding portion 253 is demodulated by the AM-demodulating portion 130 into the demodulated signal, which is then decoded by the FM-decoding portion 140 into the decoded signal, which is applied to the CPU 120 and is stored in the suitable memory in step S153. Thus, the adaptive array antenna control by the adaptive-array control portion 250 is terminated.

It will be understood that a portion of the BB portion 110 assigned to implement steps S108, S109 and S110 constitutes a judging portion configured to determine whether the signals received by the plurality of receiver antenna elements 102 are signals received from the desired communication object, depending upon a result of demodulation of the received signals by the demodulating portion.

In this third modification, too, the interrogator is capable of not only determining the direction of reception of the received signals by the phased array antenna control, but also improving the sensitivity of reception of the received signals by the adaptive array antenna control, in a comparatively short time. Namely, the adaptive array antenna control, the adaptive array antenna control is effected to maximize the sensitivity of reception of the received signals in the direction of the radio-frequency tag 14 which has been detected by the phased array antenna control.

Figure 25:
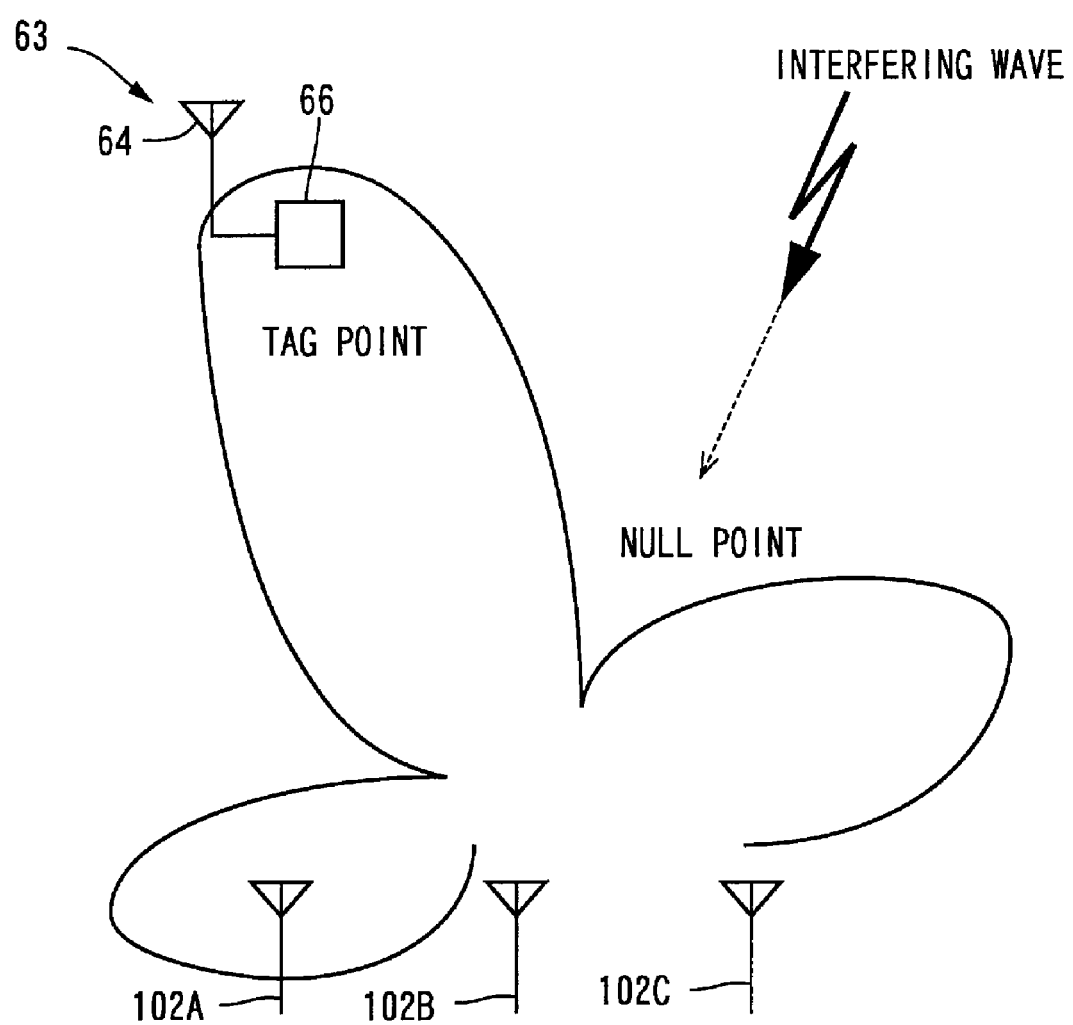
FIG. 25 is a view for explaining a behavior of the adaptive array antenna control in the modified interrogator of FIG. 24.

The third modification is further arranged such that the weights are determined by the weight control portion 252 in step S200B on the basis of the determination in steps S108-S110 as to whether the received signals have been received from the radio-frequency tag 14 or the source of an interfering wave. Described in detail, the weights are determined to increase the sensitivity of reception of the signals in the direction in which the radio-frequency tag 14 is located, and to reduce the sensitivity of reception of the signals in the direction in which the radio-frequency tag 14 is not located or in which the source of the interring wave is located, as indicated in FIG. 25. Accordingly, the strength of the signals received from the radio-frequency tag 14 can be efficiently and effectively improved in a comparatively short time.

In the third modification, step S108 is implemented to determine whether the composite signal generated by the adding portion 253 has been normally demodulated and decoded by the AM-demodulating portion 130 and FM-decoding portion 140. However, the determination as to whether the received signals received by the receiver antenna elements 102 are the signals received from the desired ratio-frequency tag 14 or the interfering signals may be made before demodulation of the composite signal, depending upon whether the composite signal in the form of a pulse signal has a pulse width or duration within a predetermined range or not. If the pulse width is outside the predetermined range, it is determined that the received signals have not been received from the radio-frequency tag 14, but are the signals received from the source of the interfering signals.

In the fifth embodiment and its modifications described above, the phased-array control portion 200 and the adaptive-array control portion 250 are enabled selectively, or operated in parallel with each other or concurrently, under the control of the common CPU 120 provided in the BB portion 110. However, two separate CPUs or hardware circuits may be provided for controlling the phased-array control portion 200 and the adaptive-array control portion 200 to operate concurrently or in parallel with each other.

In the fifth embodiment and its modifications, the BB portion 110, 110', 110" incorporates the AM-demodulating portion 130, FM-decoding portion 140, phased-array control portion 200 and the adaptive-array control portion 250. However, those portions 130, 140, 200, 250 may be mutually independent control devices separate from the BB portion 110, 110', 110".

The interrogator 100 described above uses the transmitter antenna element 101 for transmitting the transmitted wave Fc toward the circuit element 63 of the radio-frequency tag 14, and the receiver antenna elements 102 for receiving the reply wave Fr transmitted from the circuit element 63. However, the interrogator 100 may use a transmitter/receiver antenna device for transmitting the transmitted wave Fc and receiving the reply wave Fr. In this case, the interrogator 100 is provided with a transmission/reception switching device for enabling the transmitter/receiver antenna device to selectively operate as the transmitter antenna device or the receiver antenna device.

In the fifth embodiment and its modifications described above, the interrogator 100 is used in the communication system S shown in FIG. 15, the interrogator 100 may be provided in a radio-frequency tag fabricating device for fabricating the radio-frequency tags 14 by writing desired information on the circuit element 63, or in a radio-frequency tag reader/writer for reading desired information from and writing desired information on radio-frequency tags.

It is to be understood that the present invention may be embodied with various other changes which may occur to those skilled in the art, without departing from the spirit and scope of this invention.

What is claimed is:

1. A radio-frequency receiver device including a plurality of receiver antenna elements each arranged to receive signals transmitted from communication objects, said radio-frequency receiver device comprising:
    a phased-array control portion configured to perform a phased array antenna control for controlling a directivity of reception of the signals by said plurality of receiver antenna elements;
    an adaptive-array control portion configured to perform an adaptive array antenna control for controlling the directivity of reception of the signals by said plurality of receiver antenna elements;
    a received-signal-quality determining portion configured to determine whether the signals received by said plurality of receiver antenna elements have a quality of at least than a predetermined threshold; and
    a directivity control switching portion configured to enable said phased-array control portion to perform said phased array antenna control for controlling said directivity of reception of the signals, and to enable said adaptive-array control portion to perform said adaptive array antenna control for controlling said directivity of reception of the signals only if said received-signal-quality determining portion makes a negative determination that the quality of at least one signal is less than the predetermined threshold after said phased array antenna control.

2. The radio-frequency receiver device according to claim 1, wherein said adaptive-array control portion determines initial values of weights to be respectively given to the signals received by said plurality of receiver antenna elements, on the basis of a result of said phased array antenna control by said phased-array control portion.

3. The radio-frequency receiver device according to claim 1, wherein said directivity control switching portion enables said phased-array control portion to perform said phased array antenna control if the negative determination is obtained by said received-signal-quality determining portion while the directivity of reception of the signals received by said plurality of receiver antenna elements is set at an initial value.

4. The radio-frequency receiver device according to claim 1, wherein said received-signal-quality determining portion comprises a received-signal-strength determining portion configured to determine whether the signals received by said plurality of receiver antenna elements have a strength of at least a predetermined strength threshold, said received-signal-quality determining portion makes the negative determination when said received-signal-strength determining portion determines that at least one signal has a strength less than the predetermined strength threshold.

5. A radio-frequency receiver device including a plurality of receiver antenna elements each arranged to receive signals transmitted from communication objects, said radio-frequency receiver device comprising:
    a phased-array control portion configured to perform a phased array antenna control for controlling a directivity of reception of the signals by said plurality of receiver antenna elements;
    an adaptive-array control portion configured to perform an adaptive array antenna control for controlling the directivity of reception of the signals by said plurality of receiver antenna elements;
    a received-signal-quality determining portion configured to determine whether the signals received by said plurality of receiver antenna elements have a quality of at least a predetermined threshold; and
    a directivity control switching portion configured to enable said phased-array control portion to perform said phased array antenna control for controlling said directivity of reception of the signals, and to enable said adaptive-array control portion to perform said adaptive array antenna control for controlling said directivity of reception of the signals only if said received-signal-quality determining portion makes a negative determination that the quality of at least one signal is less than the predetermined threshold after said phased array antenna control,
    wherein said received-signal-quality determining portion comprises an interfering-wave determining portion configured to determine whether the signals received by said plurality of receiver antenna elements include an interfering wave, and said received-signal-quality determining portion makes the negative determination when said interfering-wave determining portion determines that at least one signal includes an interfering wave.

6. The radio-frequency receiver device according to claim 1, further comprising a decoding portion configured to decode the signals received by said plurality of receiver antenna elements, into a decoded signal, and wherein said received-signal-quality determining portion comprises an error determining portion configured to determine whether a quality of said decoded signal generated by said decoding portion is at least of a predetermined decoding threshold, said received-signal-quality determining portion makes the negative determination when said error determining portion determines that the quality of at least one signal is less than the predetermined decoding threshold.

7. The radio-frequency receiver device according to claim 1, wherein at least one of said communication objects is a radio-frequency tag configured to transmit the signal in response to a transmitted signal received from a radio-frequency communication device which is provided with the radio-frequency receiver device.

8. A radio-frequency receiver device comprising:
    a plurality of antenna elements each arranged to receive, by radio communication, a signal transmitted from a plurality of communication objects;
    a first control portion configured to perform a first control of gradually changing a directivity of reception of said plurality of antenna elements;
    a second control portion configured to perform a second control of changing said directivity of reception of said plurality of antenna elements, said second control portion comprising an adaptive-array control portion for maximizing a sensitivity of reception of the signals from said communication objects;
    a directivity control portion configured to control the directivity of reception of said plurality of antenna elements, by operating said first and second control portions, said directivity control portion includes:
        a weight determining portion configured to determine weights to be given to the signals received by said plurality of antenna elements, on the basis of the result of said first control by said first control portion, such that a composite signal obtained by combining together the signals multiplied by the determined weights approaches a reference signal; and a composite-signal generating portion configured to generate said composite signal by combining together the signals multiplied by said weights determined by said weight determining portion; and a demodulating portion configured to demodulate said composite signal generated by said composite-signal generating portion, or a signal based on said composite signal, wherein said directivity control portion operates said second control portion to maximize the sensitivity of reception of the signals from said communication objects, on the basis of a result of said first control by said first control portion, and wherein said directivity control portion further includes a judging portion configured to determine whether the signals received by said plurality of antenna elements are signals received from said communication objects, depending upon a result of a demodulating operation of said demodulating portion, and said weight determining portion determines said weights on the basis of a result of a judgment by said judging portion.

9. The radio-frequency receiver device according to claim 8, wherein said directivity control portion controls the directivity of reception of said plurality of antenna elements, by selectively enabling said first and second control portions to operate.

10. The radio-frequency receiver device according to claim 8, wherein said weight determining portion determines said weight, such that a sensitivity of reception of the signals by said plurality of antenna elements is made higher in a direction in which an affirmative determination is obtained by said judging portion, than in a direction in which a negative determination is obtained by said judging portion.

11. The radio-frequency receiver device according to claim 8, wherein said directivity control portion includes:

an arithmetic portion;

a first weight determining portion configured to determine first weights for said first control, on the basis of a phase control signal received from said arithmetic portion;

a first composite-signal generating portion configured to generate a first composite signal for said first control, on the basis of said first weights determined by said first weight determining portion;

a second weight determining portion configured to determine second weights for said second control, on the basis of a phase/amplitude control signal received from said arithmetic portion; and a second composite-signal generating portion configured to generate a second composite signal for said second control, on the basis of said second weights determined by said second weight determining portion.

12. The radio-frequency receiver device according to claim 11, wherein said first composite-signal generating portion and said second composite-signal generating portion are constituted by a common composite-signal generating portion which is configured to selectively generate said first composite signal for said first control on the basis of said first weights, or said second composite signal for said second control on the basis of said second weights.

13. The radio-frequency receiver device according to claim 12, wherein said directivity control portion includes a switching portion configured to selectively apply said first weights or said second weights to said common composite-signal generating portion.

14. The radio-frequency receiver device according to claim 13, wherein said directivity control portion includes a switching control portion configured to control said switching portion such that said first weights determined by said first weight determining portion are applied to said common composite-signal generating portion, during a first time division, while said second weights determined by said second weight determining portion are applied to said common composite-signal generating portion, during a second time division.

15. The radio-frequency receiver device according to claim 14, wherein said switching control portion controls said switching portion such that a ratio of said first and second time division is variable.

* * * * *